(12) United States Patent
Mahany et al.

(10) Patent No.: US 7,415,548 B2
(45) Date of Patent: Aug. 19, 2008

(54) COMMUNICATION NETWORK HAVING A PLURALITY OF BRIDGING NODES WHICH TRANSMITS A POLLING MESSAGE WITH BACKWARD LEARNING TECHNIQUE TO DETERMINE COMMUNICATION PATHWAY

(75) Inventors: Ronald L. Mahany, Cedar Rapids, IA (US); Robert C. Meier, Cedar Rapids, IA (US); Ronald E. Luse, Marion, IA (US)

(73) Assignee: Broadcom Corporation, Irvine, CA (US)

( * ) Notice: Subject to any disclaimer, the term of this patent is extended or adjusted under 35 U.S.C. 154(b) by 116 days.

(21) Appl. No.: 11/009,338

(22) Filed: Dec. 9, 2004

(65) Prior Publication Data

US 2005/0102443 A1 May 12, 2005

Related U.S. Application Data

(63) Continuation of application No. 10/123,873, filed on Apr. 16, 2002, now Pat. No. 6,895,450, which is a continuation of application No. 09/060,287, filed on Apr. 14, 1998, now Pat. No. 6,374,311, which is a continuation of application No. 08/395,555, filed on Feb. 28, 1995, now Pat. No. 5,740,366, which is a continuation of application No. 08/255,848, filed on Jun. 8, 1994, now Pat. No. 5,394,436, which is a continuation of application No. 07/970,411, filed on Nov. 2, 1992, now abandoned, which is a continuation-in-part of application No. 07/968,990, filed on Oct. 30, 1992, now abandoned, which is a continuation-in-part of application No. 07/769,425, filed on Oct. 1, 1992, now abandoned, said application No. 07/968,990 is a continuation-in-part of application No. PCT/US92/08610, filed on Oct. 1, 1992, which is a continuation-in-part of application No. 07/769,425, said application No. 09/060,287 is a continuation-in-part of application No. 08/545,108, filed on Oct. 19, 1995, now Pat. No. 5,940,771, which is a continuation of application No. 07/947,102, filed on Sep. 14, 1992, now abandoned, and a continuation of application No. 07/907,927, filed on Jun. 30, 1992, now abandoned, said application No. 07/947,102 is a continuation-in-part of application No. 07/907,927, which is a continuation-in-part of application No. 07/857,603, filed on Mar. 30, 1992, now abandoned, which is a continuation-in-part of application No. 07/700,704, filed on May 14, 1991, now abandoned, which is a continuation-in-part of application No. 07/699,818, filed on May 13, 1991, now abandoned, said application No. 07/907,927 is a continuation-in-part of application No. PCT/US92/03982, filed on May 13, 1992, now abandoned, and a continuation-in-part of application No. 07/769,425, filed on Oct. 1, 1991, now abandoned, and a continuation-in-part of application No. 07/802,348, filed on Dec. 4, 1991, now abandoned, which is a continuation-in-part of application No. 07/790,946, filed on Nov. 12, 1991, now abandoned.

(51) Int. Cl.
G06F 13/372 (2006.01)
G06F 3/00 (2006.01)

(52) U.S. Cl. .............. 710/18; 710/46; 709/227; 709/304; 713/320; 713/321; 713/323; 713/324; 455/342; 455/517; 455/524; 375/132; 375/202; 375/220; 370/329; 370/351

(58) Field of Classification Search .............. 710/18, 710/46; 709/227, 304; 713/320–324; 455/342, 455/517, 524; 375/132, 202, 220; 370/329, 370/351
See application file for complete search history.

(56) References Cited

U.S. PATENT DOCUMENTS

| | | | |
|---|---|---|---|
| 4,449,248 A | 5/1984 | Leslie et al. |
| 4,734,694 A | 3/1988 | Umetsu et al. |
| 4,794,649 A | 12/1988 | Fujiwara |
| 4,804,954 A | 2/1989 | Macnak et al. |
| 4,903,319 A | 2/1990 | Kasai et al. |

| | | |
|---|---|---|
| 4,964,121 A | 10/1990 | Moore |
| 4,977,611 A | 12/1990 | Maru |
| 4,989,230 A | 1/1991 | Gillig |
| 4,995,099 A | 2/1991 | Davis |
| 5,025,486 A | 6/1991 | Klughart |
| 5,027,428 A | 6/1991 | Ishiguro et al. |
| 5,029,183 A | 7/1991 | Tymes |
| 5,031,231 A | 7/1991 | Miyazaki |
| 5,055,659 A | 10/1991 | Hendrick |
| 5,058,023 A | 10/1991 | Kozikaro |
| 5,058,203 A | 10/1991 | Inagami |
| 5,081,402 A | 1/1992 | Koleda |
| 5,087,099 A | 2/1992 | Stolarczyk |
| 5,089,813 A | 2/1992 | Deluca et al. |
| 5,093,926 A | 3/1992 | Sasuta |
| 5,103,461 A * | 4/1992 | Tymes ..................... 375/141 |
| 5,117,449 A | 5/1992 | Metroka |
| 5,119,502 A | 6/1992 | Kallin et al. |
| 5,121,408 A | 6/1992 | Cai et al. |
| 5,123,029 A | 6/1992 | Bantz et al. |
| 5,128,938 A | 7/1992 | Borras |
| 5,134,347 A | 7/1992 | Koleda |
| 5,142,534 A | 8/1992 | Simpson et al. |
| 5,146,214 A | 9/1992 | Yamada et al. |
| 5,150,361 A | 9/1992 | Wieczorek et al. |
| 5,152,006 A | 9/1992 | Klaus |
| 5,168,498 A | 12/1992 | Adams et al. |
| 5,203,020 A | 4/1993 | Sato et al. |
| 5,224,150 A | 6/1993 | Neustein |
| 5,224,152 A | 6/1993 | Harte |
| 5,230,084 A | 7/1993 | Nguyen |
| 5,239,466 A | 8/1993 | Morgan et al. |
| 5,241,542 A | 8/1993 | Natarajan et al. |
| 5,241,691 A | 8/1993 | Owen |
| 5,260,988 A | 11/1993 | Schellinger et al. |
| 5,265,270 A | 11/1993 | Stengel et al. |
| 5,274,666 A | 12/1993 | Dowdell et al. |
| 5,275,254 A | 1/1994 | Shiraishi et al. |
| 5,276,680 A | 1/1994 | Messenger |
| 5,278,831 A | 1/1994 | Mabey et al. |
| 5,285,208 A | 2/1994 | Bertiger |
| 5,293,639 A | 3/1994 | Wilson et al. |
| 5,296,849 A | 3/1994 | Ide |
| 5,297,144 A | 3/1994 | Gilbert et al. |
| 5,301,225 A | 4/1994 | Suzuki et al. |
| 5,329,531 A | 7/1994 | Diepstraten et al. |
| 5,329,576 A | 7/1994 | Handforth |
| 5,343,512 A | 8/1994 | Wang |
| 5,361,397 A | 11/1994 | Wright |
| 5,371,734 A | 12/1994 | Fischer |
| 5,371,898 A | 12/1994 | Grube et al. |
| 5,373,506 A | 12/1994 | Tayloe et al. |
| 5,375,254 A | 12/1994 | Owen |
| 5,377,192 A | 12/1994 | Goodings et al. |
| 5,390,206 A | 2/1995 | Rein et al. |
| 5,392,023 A | 2/1995 | D'Avello et al. |
| 5,394,436 A | 2/1995 | Meier et al. |
| 5,420,911 A | 5/1995 | Dahlin et al. |
| 5,425,051 A | 6/1995 | Mahany |
| 5,440,560 A | 8/1995 | Rypinski |
| 5,461,627 A | 10/1995 | Rypinski |
| 5,465,081 A | 11/1995 | Todd |
| 5,533,097 A | 7/1996 | Crane |
| 5,550,895 A | 8/1996 | Burson |
| 5,584,048 A | 12/1996 | Wieczorek |
| 5,590,346 A | 12/1996 | West et al. |
| 5,649,308 A | 7/1997 | Andrews |
| 5,680,311 A | 10/1997 | Trsar et al. |
| 5,696,468 A | 12/1997 | Nise |
| 5,712,868 A | 1/1998 | Stern |
| 5,740,366 A | 4/1998 | Mahany et al. |
| 5,745,523 A | 4/1998 | Dent et al. |
| 5,757,239 A | 5/1998 | Gilmore |
| 5,825,253 A | 10/1998 | Mathe et al. |
| 5,828,695 A | 10/1998 | Webb |
| 5,910,752 A | 6/1999 | Filipovic et al. |
| 6,348,841 B1 | 2/2002 | See |
| 6,359,872 B1 | 3/2002 | Mahany et al. |
| 6,374,311 B1 | 4/2002 | Mahany et al. |
| 6,522,871 B1 | 2/2003 | Patrick et al. |
| 6,583,675 B2 | 6/2003 | Gomez |
| 6,593,826 B2 | 7/2003 | See |
| 6,694,129 B2 | 2/2004 | Peterzell et al. |
| 6,714,983 B1 | 3/2004 | Koenck et al. |
| 6,731,146 B1 | 5/2004 | Gallardo |
| 6,764,983 B1 | 7/2004 | Hammond et al. |
| 6,819,197 B2 | 11/2004 | Maldonado |
| 6,823,033 B2 | 11/2004 | Fahim |
| 6,888,913 B2 | 5/2005 | Walker |
| 6,911,856 B2 | 6/2005 | Florescu |
| 6,928,275 B1 | 8/2005 | Patrick et al. |
| 6,937,872 B2 | 8/2005 | Krasner |

FOREIGN PATENT DOCUMENTS

| | | |
|---|---|---|
| GB | 2250892 | 6/1992 |
| JP | 61-174743 | 8/1986 |
| JP | 62-37008 | 8/1994 |
| WO | WO 92/02084 | 2/1992 |

OTHER PUBLICATIONS

"Radio Networks-An Air Bridge For Data", 1989.
"The Second Overseas Radio Wave Utilization System Investigation Committee Report", Kaigai Denpa Rioy Shisutemu Chosadan Hokokusho, Dai2kai, Showa, 1987, Abstract.
Jane Generic Design Specification, Bates No. E 00 0745C-0778C.
Katarina Standard Cell Specification, Bates No. E 00 0087C-0242C.
Katie Gate Array Specification, Bates No. E 00 1498C-1620C.
Mobitex Operators Association, "Mobitex Terminal Specification To Be Used With Cantle Mobitex Radio Network Issue R1A 8000 bps," Feb. 26, 1990.
"A 1.6-3.2. GHz, High Phase Accuracy Quadrature Phase Locked Loop", Masters Thesis, Department Of Electrical Engineering And Computer Science, Mass. Inst. Of Technology, Jun. 2003.
Digital And Ericsson Agree On Data Network Project, Wall Street Journal, Oct. 8, 1991, p. B4.
"Messenger User Guide", Cognito Limited, Apr. 1991.
"Standards: Ericsson", Communications International 1991, Sep. 1991, p. 46.
Posthearing Brief Of The Commission Investigative Staff, United States International Trade Commission, Apr. 3, 2006.
Joifaei et al., "Concept Of On-Board-Processing Satellites", IEEE—ICUPC '92 Proceedings, Sep. 29-Oct. 2, 1992, pp. 391-394.
Seshadri et al., "Coded Modulation With Time Diverstiy, Unequal Error Protection And Low Delay For The Rayleigh Fading Channel", IEEE—ICUPC '92 Proceedings, Sep. 29-Oct. 2, 1992, pp. 283-287.
Slimane et al., "Coded Quadrature Pulse-Overlapping Modulation Techniques For Personal Communications", IEEE—ICUPC '92 Proceedings, Sep. 29-Oct. 2, 1992, pp. 293-297.
Wang, "Coded BER Performance In A Correlative Fading Channel", IEEE—ICUPC '92 Proceedings, Sep. 29-Oct. 2, 1992, pp. 126-130.
"Ericsson Wins Mobile Data Pact", Communications Week International, Jun. 26, 1989, No. 21, p. 13.
Rohl, A Short Look on Power Saving Mechanisms in the Wireless LAN Standard Draft IEEE Standard 802.11, Jun. 26, 1997, Bates No. QBB218363-368.
Mobitex Operators Association, "Addendum Battery-Saving Protocol for Portable Terminals," Aug. 17, 1990.
Radio Data Link Access Procedure published by Motorola, Mar. 1991.
Notice Regarding Issuance Of Initial Determination And Recommended Determination On Remedy And Bond, Oct. 10, 2006.
Rebuttal Expert Report Of Ray Nettleton Regarding Validity Of U.S. Patent Nos. 5,714,983 and 6,374,311 (redacted version), Dec. 15, 2005.

Invalidity Expert Report Of Dr. John Proakis (redacted version), Dec. 5, 2005.
Mobitex System Description MTS02.1.
Mobitex Network Layer for Terminals Appendix B MTS09A.2.
GSM 07.01 v 3.13.0, Feb. 1991.
Qualcomm Incorporated's Sixth Supplemental Objections And Responses To Complainants's First Set Of Interrogatories (Nos. 1-15), Dec. 9, 2005.
Yu, "Overview of EIA/TIA IS-41", IEEE 1992.
Qualcomm Incorporated's Sixth Supplemental Objections And Responses To Complainant's First Set Of Interrogatories (Nos. 1-15), Dec. 9, 2005.
Kishine et al., "A 2.5 Gb/s Clock And Data Recovery IC With Tunable Jitter Characteristics For Use In LAN's And WAN's", IEEE J. of Solid-State Circuits, Jun. 1999, vol. 34, No. 6, pp. 805-812.
Kral et al., "RF-CMOS Oscillators With Switched Tuning", Custom IC Conference, Santa Clara, CA, May 1998, pp. 555-558.
Kral, "A 2.4 GHz CMOS Frequency Synthesizer", UCLA Integrated Circuits And Systems Laboratory, Mar. 1998.
Second Supplemental Expert Report Of Dr. John Proakis (redacted version), Feb. 9, 2006.
"CDMA Digital CAI Standard, Cellular System Dual-Mode Mobile Station-Base Station Compatability Standard, Rev. 1.11", Feb. 5, 1992, Bates Nos. QBB148827-9062.
"Man-Machine Interface Of The Mobile Station", GSM 02.30 v. 3.9.0, Feb. 1992, QBB155113-155137.
"Update On Ardis-Mobitex Radio Modern Competition", Newsbyte News Network, Oct. 2, 1991.
"Waiting Time For Wireless", Computerworld, Oct. 15, 1990, pp. 73-75.
MS-BSS Interface—General Aspects And Principles, GSM 04.01 v 3.0.01, Feb. 1992, QBB155196-155206.
Network Functions, GSM 03.01 v 3.0.0, Feb. 1992, QBB155138-155152.
Robert Meier Deposition Transcript, Nov. 18, 2005.
Steven Koenck Deposition Transcript, Nov. 15, 2005.
Technical Manual Callmaster IMTS Series: MT-200 & MT-300, 1982.
"Ericsson—Company Report: Svenska International PLC", Ericsson Company Report, Svenska International PLC, Investext Report No. 1152645, Nov. 15, 1991, p. 2.
Calhoun, Wireless Access and the Local Telephone Network, 1992.
Respondent Qualcomm Incorporated's Notice Of Prior Art, with Exhibits A & D attached thereto.
Qualcomm's Response To Interrogatory 3, with Exhibits B & C attached thereto.
"A New Chapter In Wireless Communication And Email", Electronic Messaging News, Nov. 27, 1991, vol. 3, No. 24.
"A New Radio Access Protocol And Network Architecture For Mobile Packet Data", Cognito Group Limited, Bates Nos. QBB569268-323.
"AMDC Extends RFP Deadline To Mar. 10; Waiver Decision Expected At FCC's March Meeting", Industrial Communications, Feb. 17, 1989, No. 7.
"AMDC Picks Ericsson Gear", Communications Week, Jun. 12, 1989, vol. 252, p. 44.
"An Effective Prioritization Scheme For Handovers In Cellular Networks", IEEE—ICUPC '92 Proceedings, Sep. 29-Oct. 2, 1992, pp. 364-368.
"Ardis Links With NCR Notepad Dec. 11, 1991", Newsbytes, Dec. 11, 1991.
"Ardis To Face Competition From RAM", Newsbytes, Feb. 5, 1991.
"Automation In Warehousing", Proceedings Of The 8th International Conference, Tokyo, Japan, Oct. 6-8, 1987, pp. 1-355.
"Autonomous Radio Stations Possible Over Mobiltex", Industrial Communications, Dec. 9, 1988, No. 48.
"Bean Bullish On Growth Of Mobile Data In New Future", Industrial Communications, Feb. 15, 1991, No. 7, p. 8.
"Bellsouth Buys Into Ram's Nationwide Mobile Data Network", Industrial Communications, Oct. 18, 1991, No. 42.
"BellSouth Has Options To Buy RAM Oct. 11, 1991", Newsbytes, Oct. 11, 1991.

"BellSouth RAM In Joint Venture", BOC Week, Oct. 21, 1991, vol. 8, No. 40, p. 12.
"Bellsouth, RAM To Form Mobile Communications Joint Venture", PR Newswire, Oct. 10, 1991, p. 1.
Briefing Document For The Design Of The Diplema Messager MMI, Mar. 1989.
"Broadband Lan Technology", 1988.
"BT Opens New Service Center", Communications Week, Nov. 11, 1991, p. 25.
"Business Plan Appendix IV—Financial Projections".
"C Business Plan" Cognito Group Limited, Nov. 1, 1990.
"C Business Plan", Cognito Group Limited, Apr. 1990.
"Canadian Cellular Industry (the)—Industry Report", First Marathon Securities Ltd. Industry Report, Oct. 25, 1991, Investext Report No. 1154903, p. 30.
"Cantel To Launch Mobile-Data And Paging Networks", The Gazette, Montreal Quebec, May 10, 1989, p. D1.
"CDMA Digital CAI Standard, Cellular System Dual-Mode Mobile Station-Base Station Compatability Standard, Draft Rev. 0", Jul. 31, 1990, Bates Nos. QBB138614-832.
"CDMA Digital CAI Standard, Cellular System Dual-Mode Mobile Station-Base Station Compatability Standard, Draft Rev. 1", Oct. 1, 1990, Bates Nos. QBB138833-9249.
"CDMA Digital CAI Standard, Cellular System Dual-Mode Mobile Station-Base Station Compatability Standard, Draft Rev. 1.1", Jul. 15, 1991, Bates Nos. QBB139250-858, 393.
"Cellular System Dual-Mode Mobile Station—Base Station Compatibility Standard", EIA/TIA Interim Standard, May 1990, IS-54.
"Cellular System Mobile Station—Land Station Compatibility Specification", Office Of Science Technology Bulletin No. 53, Jul. 1983.
"Change Request 05.02-11", Recommendation GSM 05.02, v. 3.3.0, Jun. 22, 1989.
"Change Request 05.02-14", Recommendation GSM 05.02, v. 3.3.0, Nov. 28, 1989.
"Coded First To Jump On Mobitex Equipment Bandwagon; Sees Data Licenses As Worth As Much As Cellular", Industrial Communications, Jun. 9, 1989, No. 22.
"Communications Personals", Communincations Daily, Feb. 11, 1991, vol. 11, No. 28.
"Complexity, High Price Keep Some Customers Away: Mobile Datacoms Taxes Users", Communications Week International, Apr. 1, 1991, p. 20.
"Consolidation, New Ventures Going Full Speed Ahead In All Markets", Industrial Communications, Oct. 6, 1989, No. 36, p. 1.
"Covering Note To Draft Rec. GSM 01.04 Version 2.00.01—Vocabulary In A GSM PLMN", GSM 01.04 v. 2.00.01, Sep. 28, 1990.
"Cutting The Ties That Bind", InformationWeek, Apr. 1, 1991, vol. 314, pp. 25-30.
"DEC On Move: Teaming With Ericsson In Mobile Data Market", Communications Week International, Mar. 18, 1991, p. 1.
"DEC Targets Mobile Data Market", Communications Week International, Mar. 18, 1991, p. 9.
"DEC-Ericsson Agreement", Communications Week, Nov. 11, 1991, p. 25.
"Descriptive Air Interface Protocol", Cognito Group Limited, V. 6.0, Aug. 19, 1991.
"Digital And Ericsson To Co-Operate On Mobile Data", Exchange, Nov. 1, 1991, vol. 3, No. 42.
"Discontinuous Reception (DRX) in the GSM System", Recommendation GSM 03.13, v 3.0.2, Jan. 15, 1990.
"Editorial: Telecom Trends", Newsbyte News Network, Dec. 24, 1991.
"Ericsson—Company Report First Boston Corporation (The)", Jun. 10, 1988, Investext Report No. 813838, p. 9.
"Ericsson—Company Report: Hoare Govett Investment Research Ltd", Oct. 1, 1990, Investext Report No. 1039045, p. 22.
"Ericsson—Company Report: Prudential Securities Inc.", Mar. 19, 1990, Investext Report No. 1001955, p. 10.
Ericsson—Company Report: Svenska International PLC, Ericsson Company Report, Svenska International PLC, Investext Report No. 1142535, Oct. 4, 1991, p. 2.

"Ericsson (L.M.) (Telefon A/B)—Company Report: FT Analysis", Ericsson (L.M.) (Telefon A/B) Company Report FT Analysis, Investext Report No. 6027183, Nov. 19, 1991, p. 3.

"Ericsson And Digital Cooperate On Mobile Communications", Newsbyte News Network Oct. 8, 1991, Newsbytes, Oct. 8, 1991.

"Ericsson And Digital Cooperated In Mobile Data", Business Wire, San Francisco, Oct. 7, 1991, p. 1.

"Ericsson And GE And Speedwing Mobile Communications Team Up To Bring Mobile Data Communications To Airports Worldwide", Business Wire, San Francisco, Sep. 17, 1991, p. 1.

"Ericsson And GE Have Formed Joint Venture", Communications Daily, Jun. 28, 1989.

"Ericsson Announces Communications Software", Industrial Communications, Mar. 1, 1991, No. 9.

"Ericsson GE And Melard Technologies Announce A Strategic Alliance In Mobile Data Communications", Business Wire, San Francisco, Sep. 30, 1991, p. 1.

"Ericsson GE And Racotek Announces A Strategic Relationship For Mobile Data Communications", Business Wire, San Francisco, Sep. 16, 1991, p. 1.

"Ericsson GE And Racotek Inc. In Marketing Supply Deal", Alliance Alert-Medical Health, vol. 2, No. 10, Oct. 1, 1991.

"Ericsson GE And Speedwing Mobile Commun In Marketing Supply Deal", Alliance Alert-Medical Health, Oct. 1991, vol. 2, No. 10.

"Ericsson GE Awarded $11.6 Million Contract From The U.S. Navy", Business Wire, San Francisco, Nov. 10, 1993, p. 1.

"Ericsson GE Awarded Contract From The City Of Richardson, Texas", Business Wire, San Francisco, Oct. 1, 1991, p. 1.

"Ericsson GE In Development Deal With Anterior And RIM", Newsbyte News Network, Nov. 20, 1991.

Ericsson GE In Joint Ventures To Develop Wireless E-Mail, Telecommunications Alert, Nov. 19, 1991, vol. 8, No. 38.

"Ericsson GE Mobile Communications New R&D Center Begins Operations In North Carolina", Business Wire, San Francisco, Nov. 27, 1990, p. 1.

"Ericsson GE Mobile Communications Opens Research And Developmental Center In North Carolina", Business Wire, San Francisco, May 1, 1990, p. 1.

"Ericsson GE Mobile Communications To manage Its Worldwide Cellular Telephone Business From RTP, N.C.", Business Wire, San Francisco, Apr. 24, 1991, p. 1.

"Ericsson GE Mobile Data And BRM Mobile Data Sign Agreements With GE Consumer Service", News Release, Jul. 25, 1991, p. 1.

"Ericsson GE Mobile Data And RAM Mobile Data Sign Agreements With GE Consumer Services", Business Wire, San Francisco, May 9, 1991, p. 1.

"Ericsson GE, Anterior Technology & Research In Motion (RIM)—Announce Wireless Access For E-Mail Users", News Release, Nov. 18, 1991, p. 1.

"Ericsson Gets $55M Pact for Cellular Radio Data Gear", Electronic News (1991), p. 19, Jun. 12, 1989.

"Ericsson Has Data Unit" Communications Week, Jan. 8, 1990, p. 8.

"Ericsson Mobile Data Formed In New Jersey", Communications Daily, Jan. 5, 1990.

"Ericsson Signs $55 Million Agreement With RAM Broadcasting For Mobile Data Network", Industrial Communications, Jun. 2, 1989, No. 20.

"Ericsson To Introduce Radio Modem Next Month", Telecommunications Alert, Dec. 17, 1991, vol. 8, No. 56.

"Ericsson/GE Announces New Agreements", Industrial Communications, Oct. 4, 1991, No. 40.

"Ericsson: Breakthrough $55 Million Agreement For Mobile Data Network In U.S.A.", Edge, Jun. 12, 1989, vol. 4, No. 64.

"Ericsson's Mobitex Mobile Data System Is Chosen By Cantel For Nationwide Public Mobile Data Service In Canada", News Release, Ericsson (LM) Telephone, Dec. 1, 1988, p. 1.

"European Digital Cellular Telecommunications System (Phase 1), Network Functions", GSM 03.01 v 3.1.1, Feb. 1992.

"European Digital Cellular Telecommunications System (Phase 2), Discontinous Reception (DRX) In The GSM System", GSM 03.13, v. 4.0.1, Jul. 1, 1993.

"European Digital Cellular Telecommunications System (Phase 2), Functions Related To MS In Idle Mode", GSM 03.22, Version 4.4.0, Jun. 25, 1993.

"European Digital Cellular Telecommunications System (Phase 2), Mobile Stations (MS) Features", GSM 02.07, Oct. 1993.

"European Digital Cellular Telecommunications System (Phase 2), Mobile Stations Features", GSM 02.07, v. 4.4.1, Jun. 7, 1993.

"FCC Calendar Of Events For The Week Of Feb. 11", FCC Daily Digest, Feb. 8, 1991, vol. 10, No. 27.

"IBM, Motorola Join Networks Forming 2-Way Data Offering", Industrial Communications, Feb. 2, 1990, No. 5, p. 1.

"Industry Briefs", Network World, Oct. 14, 1991, vol. 8, No. 41, pp. 9, 11.

Lead Story #2: Swedish Government Picks Magnovox AVL For Upcoming Trials, Inside IVHS, Feb. 4, 1991, vol. 1, No. 3.

"Man-Machine Interface Of The Mobile Station", Recommendation GSM 02.30, v 3.5.0, Mar. 1990.

"Minigrams", Computergram International, No. 1805, CGI11150023, Nov. 15, 1991.

"Mobidata And Cantel Set To Complete In Digital Mobile Data Market", Common Carrier Week, May 22, 1989, vol. 6, No. 21.

"Mobile Data Communications—A New Market", News Release, Jul. 3, 1987, p. 1.

"Mobile Data Communications: Erickson GE & Racotek In Strategic Relationship", Edge, Sep. 23, 1991, vol. 6, No. 165, p. 6.

"Mobile Data Communications: Ericsson GE & Racotek In Strategic Relationship", Edge, Sep. 23, 1991, vol. 2, No. 70, p. 21.

"Mobile Move", CommunicationsWeek International, Nov. 4, 1991, No. 73, p. 3.

"Mobile Station Features", Recommendation GSM 02.07, v 3.4.0, Jan. 1991.

"Mobile Station Features", Recommendation GSM 02.07, v. 3.3.0, Mar. 1990.

"Mobile Station Features", Recommendation GSM 02.07, v. 3.4.1, Feb. 1992.

"Mobile Station Features", Recommendation GSM 02.07, v. 3.4.1, Apr. 1991.

"Mobile Users Get Electronic Malt Link (Anterior Technology)", Communications International, Dec. 13, 1991, No. 1823, CGl12120016.

"Motorola Inc.—Company Report: Kidder, Peabody & Company, Inc.", May 15, 1990, Investext Report No. 1011254, p. 2.

"MS-BSS Interface Date Link Layer Specification", Recommendation GSM 04.06, v. 3.6.0.

"MTEL WOOS FCC For Two-Way Data Net At 930-931 MHz", Industrial Communications, No. 47, Nov. 22, 1991.

"Multi-Channel Land Mobile Systems For Dispatch Traffic (With Or Without PSTN Interconnection)", ITU-R—International Telecommunication Union/ITU Radiocommunication Sector, 1990, Report No. 741-3, pp. 142-153.

"Multiplexing And Multiple Access On The Radio Path", GSM Recommendation 05.02, v. 3.4.1, Jan. 1990.

"National Car Rental Chooses RAM For Data Network Services", Industrial Communications, VIS24, Jun. 14, 1991.

"National Mobile Data Network Sends Out Request For Information: Dream System In Mind Already", Industrial Communications, Oct. 21, 1988.

"Noise-Free Data Nets Introduced", Telecommunications Alert, Jul. 1990, vol. 8, No. 7.

"Nokia—Line Of Business Classification", Annual Report, 1987.

"Nordic Monthly—Geographic Report: Svenska International PLC", Oct. 1, 1999, Investext Report No. 1142734, p. 6.

"Northern Indiana Public Service Company Selects $10 Million Ericsson GE Communications System", News Release, Nov. 11, 1991, p. 1.

"Other Manufactures Developing Compatible Hardware", Industrial Communications, Dec. 9, 1988, No. 48.

"Outline Of Idle Mode Tasks, GSM Recommendation" 03.22, v. 1.0.1, May 23, 1991.

"Physical Layer On The Radio Path: General Description", Change Request 05.02-2, Recommendation GSM 05.01, v. 3.3.0, Nov. 17, 1989.

"Physical Layer On The Radio Path: General Description", GSM 05.01, v. 3.2.0, May 1988.

"Programme Management Review, GSM Action Plan, Review 18" ETSI/GSM 23, Jun. 5, 1989.

"Programme Management Review; GSM Action Plan, Review 18", GSM 243/89, Jun. 5, 1989.

"Proposed EAI,TIA Standard, Cellular System CDMA-Analog Dual-Mode Mobile Station—Base Station Compatibility Standard, Rev. 1.12", Mar. 16, 1992.

"Proposed EAI,TIA Standard, Cellular System CDMA-Analog Dual-Mode Mobiel Station—Base Station Compatibility Standard, Rev. 1.13", Mar. 23, 1992.

"Proposed EIA/TIA Interim Standard, Wideband Spread Spectrum Digital Cellular System Dual-Mode Mobile Station—Base Station Compatibility Standard", EIA/TIA/IS-95, Apr. 21, 1992.

"Radio-Linked Network To Be Offered To Airlines Sep. 19, 1991", Newsbytes, Inc., Sep. 19, 1991.

"RAM Adds Customers To Mobile Data Network", Industrial Communications, Apr. 5, 1991, No. 14.

"RAM Mobile Data And Ericsson GE Mobile Data Announces Agreements With Sears Business Centers", News Release, Mar. 26, 1991, p. 1.

"RAM Mobile Data Launches Network With Transcontinental Message", News Release, Feb. 20, 1991, p. 1.

"Ram Signs GE Consumer Service To A Pilot Test On its Data Network", Industrial Communications, May 10, 1991, No. 19.

"Sales Decline: Ericsson 9-Month Net Off 53%", Electronic News, 1991, vol. 37, Issue 18.

"Sears Business Centers To Market RAM's Mobile Data Network", Industrial Communications, Mar. 29, 1991, No. 13.

"Sears Inks Pacts With Ericsson, RAM Mobile Data", Computer Reseller News, Apr. 29, 1991, 102, Issue 418, p. 1-2.

"Security Related Network Functions", Recommendation GSM 3.20, v. 3.3.2, Jan. 1991.

"Service", Industrial Communications, Dec. 9, 1988, No. 48.

"SIM, Functional Characteristics", Recommendation GSM 02.17, v. 3.2.0, Mar. 1990.

"Simware And Ram Mobile Data Network Sign Strategic Marketing Agreement", News Release, Oct. 7, 1991, p. 1.

"Smith Barney's Morning Call—Topical Report Smith Barney, Harris Upham & Co.", Investext Report, No. 1145237, Oct. 11, 1991, p. 3.

Wepman et al., "Spectrum Usage Measurements In Potential PCS Frequency Bands", IEEE—ICUPC '92 Proceedings, Sep. 29-Oct. 2, 1992, pp. 10-15.

"Strategic Agreement: Simware & Ericsson GE In Strategic Marketing Agreement For Laptop Computer Access To Corporate Mainframes", Edge, Oct. 21, 1991, vol. 6, No. 169, p. 17.

"Supporting Research And Advanced Development", NASA Space Programs Summary 37-48, vol. III, Jet Propulsion Laboratory, Dec. 31, 1967, pp. 1-291.

"Sweden Launches The World's First Public Radio Telecommunication Network For Text, Speech And Data", Newswire, Trade Publication, Industrial News Service, Feb. 24, 1987.

"Swedish Road Administration To Try Out Vehicle Location System", Industrial Communications Trade Publication, Apr. 5, 1991, No. 14.

"Swedish Telecom Mobitex System Eases Mobile Frequency Congestion", Communications News, Apr. 1985, vol. 22, No. 4, p. 135.

"The Messenger MMI Specification", Mar. 1990.

"The Mobitex Packet-Switched Radio Data System", IEEE, Jul. 1992, pp. 534-538.

"The OSPF Specification", Oct. 1989.

Bertoni et al., "Theoretical Prediction Of Slow Fading Statistics in Urban Environments", IEEE—ICUPC '92 Proceedings, Sep. 29-Oct. 2, 1992, pp. 1-4.

"Third-Quarter Losses Prompt Sizable Ericsson Layoffs", Industrial Communications, Nov. 22, 1991, No. 47.

Devasirvatham et al., "Two Frequency Radiowave Propagation Measurements in Brooklyn", IEEE—ICUPC '92 Proceedings, Sep. 29-Oct. 2, 1992, pp. 23-27.

"U.K. Mobile Data Licenses Granted", Communications Week International, Feb. 26, 1990, No. 36, p. 18.

"U.S. Army Selects Digitally Accessed Trunked Communications System For Training Centers", News Release, Oct. 1, 1991, p. 1.

"Update On Ardis-Mobitex Radio Modem Competition", Newsbytes, Inc., Oct. 2, 1991.

Xia et al., "Urban And Suburban Microcellular Propagation", IEEE—ICUPC '92 Proceedings, Sep. 29-Oct. 2, 1992, pp. 5-9.

"Vandals Wreck Cardphones To Increase Booty From Payphones", Europe 2000—Communications & Information Technology, Sep. 1991, vol. 3, No. 7.

"Vehcile Tracking And Communication Joint Venture", PRS Automotive Service, Aug. 22, 1991.

"Why Did Ericsson Pick Up The Long-For-Sale GE Subsidiary?", Mobile Phone News, Aug. 31, 1989, vol. 7, No. 18.

"Wireless Data: The Next Frontier For Cellular", Mobile Phone News, Dec. 5, 1991, vol. 9, No. 24, pp. 4-6.

"Wireless World: Ericsson GE Enters Lockdown Matrix With Mobile Digital Telephone", Business Wire, San Francisco, Oct. 7, 1991, p. 1.

"Wireless World: Ericsson GE In Lockdown Matrix With Mobile Digital Telephone", Edge, Oct. 7, 1991, vol. 6, No. 167, p. 29.

"Wireless World: Ericsson GE, Anterior Technology & Research In Motion Announced Wireless Access For E-Mail Users", Business Wire, San Francisco, Nov. 18, 1991, p. 1.

"Wireless World: Ericsson GE, Anterior Technology & Research In Motion (RIM) Announces Wireless E-mail", Edge, Nov. 25, 1991, vol. 6, No. 174, p. 4.

"Year's Biggest Stories Land In Personal Communications, Spectrum (Part 1)" Industrial Communications, Jan. 4, 1991, No. 1.

Abowd et al., "Cyberguide: A Mobile Context-Aware Tour Guide", Wireless Networks, 1997, vol. 3, pp. 421-433.

Afek et al., "End-To-End Communication In Unreliable Networks", Proceedings Of The 7th Annual ACM Symposium On Principles Of Distributed Computing (Toronto, Ontario, Canada), 1988, pp. 131-148.

Aguirre et al., "Signal Strength Measurements At 915 MHz and 1920 MHz In An October Microcell Environment", IEEE—ICUPC '92 Proceedings, Sep. 29-Oct. 2, 1992, pp. 16-22.

Olmos et al., "Performance Analysis Of A Second Order Delay-Lock Loop With Application To A CDMA System With Multipath Propagation", IEEE—ICUPC '92 Proceedings, Sep. 29-Oct. 2, 1992, pp. 209-213.

Akaiwa et al., "The Channel Segregation, A Self-Organized Dynamic Channel Allocation Method: Application to TDMA/FDMA Microcellular System", IEEE—ICUPC '92 Proceedings, Sep. 29-Oct. 2, 1992, pp. 345-349.

Alfano et al., "UPT Supplementary Services European Standards Scenario", IEEE—ICUPC '92 Proceedings, Sep. 29-Oct. 2, 1992, pp. 69-73.

Ameden, "Activities Of The Cellular Telecommunications Industry Association Microcell/Microsystems Subcommittee Regarding Microcell Technology", IEEE—ICUPC '92 Proceedings, Sep. 29-Oct. 2, 1992, pp. 147-150.

Aoki, "Improved Output Spectrum Of Linearized Class-F Power Amplifier For Digital Cellular Mobile Communications", IEEE—ICUPC '92 Proceedings, Sep. 29-Oct. 2, 1992, pp. 195-198.

Arndt et al., "International Standards On Universal Personal Telecommunications: State Of The Art And Future Projections", IEEE—ICUPC '92 Proceedings, Sep. 29-Oct. 2, 1992, pp. 59-63.

Assarsson, "Technology, Know-How And Teamwork—The Vital Circle In A Ro-Ro Port", Report No. 0-904930-27-0, 1984, pp. 138-142.

Badrinath et al., "Designing Distributed Algorithms For Mobile Computing Networks", Proceedings Of The Second Workshop On The Management Of Replicated Data Rutgers University, 1994, pp. 1-13.

Badrinath et al., "To Send Or Not To Send: Implementing Deferred Transmission In Mobile Host", ICDCS, Hong Kong, Jun. 1996, pp. 1-7.

Balakrishnan et al., "Improving Reliable Transport And Handoff Performance In Cellular Wireless Networks", Wireless Networks, 1995, vol. 1, pp. 469-481.

Bart, "Vendors Join The Wireless Bandwagon", Communications International, Oct. 1991, vol. 18, No. 19, p. 25.

Bartoli, "Group-Based Multicast And Dynamic Membership In Wireless Networks With Incomplete Spatial Coverage", Mobile Networks And Applications 3, 1998, pp. 175-188.
Bean, "Paging At The Crossroads—Industry Report", Arthur D. Little Decision Resources, Inc., Jun. 27, 1990, Investext Report No. 1111592, pp. 5-6.
Bedingfield, "On The Concept Of A Service Host For Personal Comunications Services", IEEE—ICUPC '92 Proceedings, Sep. 29-Oct. 2, 1992, IEEE—ICUPC '92 Proceedings, Sep. 29-Oct. 2, 1992, pp. 314-318.
Berkman, "Ericsson Is Restructuring To Adapt To A Deregulated Global Market", Electronic Business, Jan. 21, 1991, vol. 17, No. 2, pp. 34-38.
Berntson, "Mobitex—A New Network For Mobile Data Communications", Ericsson Review, 1989, vol. 66, Issue 1, p. 33, Bates Nos. QBB151463-151469.
Biba, "A Hybrid Wireless MAC Protocol Supporting Asynchronous And Synchronous MSDU Delivery Services", IEEE 802.11/91-92, Sep. 1991.
Binkley et al., "Authenticated Ad Hoc Routing At The Link Layer For Mobile Systems", Wireless Networks, 2001, vol. 7.
Blankenhorn, PacTel Cellular Introduces Microcells In Los Angeles, Newsbytes, Inc., Oct. 2, 1991.
Blazević et al., "Self-Organizing Wide-Area Routing", Proc. Of SCI, 2000, pp. 1-8.
Boncompagni et al., "Comments: Telecom Leaders From Around The World Reveal their Plans For The Future", Telephony, Feb. 27, 1989, vol. 216, No. 9, p. 28.
Booker, "Cellular Modems Put The Office On The Road", Computerworld, Mar. 11, 1991, vol. 25, No. 10, pp. 43-44.
Booker, "Wireless Networks Create Tough Choices", Computerworld, Dec. 2, 1991, vol. 25, No. 48, pp. 55-56.
Borgman, "Telefonaktiebolaget Lm Ericsson—Company Report: Dillon, Read & Co.", May 21, 1990, Investext Report No. 1008947, p. 12.
Boyer, "An Analytical Comparison Of Block Error Rate Performance For Wireless Data Modulation Standards In A Variably Fading Ricean Analog Cellular Channel", IEEE—ICUPC '92 Proceedings, Sep. 29-Oct. 2, 1992, pp. 121-125.
Bragwad et al., "Advanced Intelligent Network Requirements For Personal Communications Services", IEEE—ICUPC '92 Proceedings, Sep. 29-Oct. 2, 1992, pp. 324-328.
Brodsky, "Wireless Data Networks And The Mobile Workforce", Telecommunications, Dec. 1990, vol. 24, No. 12, p. 31.
Brodsky, "Wireless MANs/WANs Offer 'Data To Go'", Business Communications Review Feb. 1991, vol. 21, No. 2, p. 45-51.
Buck, "Tele-Trends—Industry Report, Donaldson, Lufkin & Jenrette Securities Corp.", Jun. 24, 1988, Investext Report No. 814739, p. 8.
Bulusu et al., "Scalable coordination For Wireless Sensor Networks: Self-Configuring Localization Systems", Proceedings Of The 6th International Symposium On Communication Theory And Applications (ISCTA), Jul. 2001, pp. 1-6.
Bushaus, "GE, Ericsson In Cellular Pact", Telephony's AM Report, Aug. 28, 1989, vol. 217, No. 10, p. 3.
Cáceres et al., Fast And Scalable Wireless Handoffs In Support Of Mobile Internet Audio, Mobile Networks And Applications 3, 1998, pp. 351-363.
Cáceres et al., "The Effects Of Mobility On Reliable Transport Protocols", International Conference On Distributed Computing Systems, Nov. 1, 1993.
Cáceres et al., "Improving The Performance Of Reliable Transport Protocols In Mobile Computing Environments", IEEE Journal On Selected Areas In Communications, Jun. 1995, vol. 13, No. 5, pp. 1-10.
Calhoun, "Digital Cellular Radio", 1988.
Callendar, "Standard For Global Personal Communications Services", IEEE—ICUPC '92 Proceedings, Sep. 29-Oct. 2, 1992, pp. 163-167.
Camazza et al., "PCS Data Management In An Intelligent Network", IEEE—ICUPC '92 Proceedings, Sep. 29-Oct. 2, 1992, pp. 329-333.
Campbell et al., "A Cellular IP Testbed Demonstrator", Center For Telecommunications Research, Columbia University, New York, 1999, pp. 1-4.
Carpintero et al., "Requirements For The Interconnection Of Base Stations In A Wireless System", IEEE—ICUPC '92 Proceedings, Sep. 29-Oct. 2, 1992, pp. 141-146.
Cellular Data Network Functional Specification Rev. 2.0.2, Oct. 5, 1992.
Cellular Digital Packet Data System Specificiation Overview.
Cellular Digital Packet Data System Specification Preliminary Release 0.8—Book 1, Mar. 19, 1993.
Cellular Digital Packet Data System Specification Preliminary Release 0.8—Book II, Mar. 19, 1993.
Cellular Digital Packet Data System Specification Preliminary Release 0.8—Book III, Mar. 19, 1993.
Cellular Digital Packet Data System Specification Release 0.3 Preliminary Working Draft, Dec. 28, 1992.
Cellular Digital Packet Data System Specification Release 0.8—Book 4IV, Mar. 19, 1993.
Cellular Digital Packet Data System Specification Release 0.8—Book V, Mar. 19, 1993.
Cellular Digital Packet Data System Specification Release 0.9—Preliminary Draft, N/A, Apr. 30, 1993.
Cellular Digital Packet Data System Specification Release 1.0—Book II, Jul. 19, 1993.
Cellular Digital Packet Data System Specification Release 1.0—Book III, Jul. 19, 1993.
Cellular Digital Packet Data System Specification Release 1.0—Book IV, Jul. 19, 1993.
Cellular Digital Packet Data System Specification Release 1.0—Book V, Jul. 19, 1993.
Cellular Digital Packet Data System Specification Release 1.0—Book I, Jul. 19, 1993.
Cellular Digital Packet Data System Specification Release 1.1—Book 1, 1995 CDPD Forum, Inc., Jan. 19, 1995.
Cellular Digital Packet Data System Specification Release 1.1—Book 2, 1995 CDPD Forum, Inc., Jan. 19, 1995.
Cellular Digital Packet Data System Specification Release 1.1—Book 3, 1995 CDPD Forum, Inc., Jan. 19, 1995.
Cellular Digital Packet Data System Specification Release 1.1—Book 4, 1995 CDPD Forum, Inc., Jan. 19, 1995.
Cellular Digital Packet Data System Specification Release 1.1—Book 5, 1995 CDPD Forum, Inc., Jan. 19, 1995.
Cellular Digital Packet Data System Specification Release 1.1—Book 6, 1995 CDPD Forum, Inc., Jan. 19, 1995.
Cellular Digital Packet Data System Specification Release 1.1—Book 7, 1995 CDPD Forum, Inc., Jan. 19, 1995.
Cellular Digital Packet Data System Specification Release 1.1—Book 8, 1995 CDPD Forum, Inc., Jan. 19, 1995.
Chang, "Dispersive Fading Effects In CDMA Radio Systems", IEEE—ICUPC '92 Proceedings, Sep. 29-Oct. 2, 1992, pp. 185-189.
Change Request to Specification GSM 02.11 Service Accessibility GSM 02.11, v 4.4.0, Feb. 11, 1993.
Chen et al., "Signaling System No. 7 Network Interconnect Impacts In Support Of Mobile Communications Services", IEEE—ICUPC '92 Proceedings, Sep. 29-Oct. 2, 1992, pp. 247-252.
Chuang, "Frequency Reuse For Two Co-Existing TDMA Personal Communications Systems", IEEE—ICUPC '92 Proceedings, Sep. 29-Oct. 2, 1992, pp. 350-354.
Ciancetta et al., "Universal Personal Telecommunication Provision Within Intelligent Networks", IEEE—ICUPC '92 Proceedings, Sep. 29-Oct. 2, 1992, pp. 319-323.
Connolly, "Mobile Data Mission", Communications, Aug. 1990, vol. 27, No. 8, pp. 41-48.
Coursey, Mobile Computing Matures: Radio Modems Will Let Portables Send, Receive E-Mail, InfoWorld, 1991, vol. 13, Issue 51, p. 28.
Craninckx et al., "Wireless CMOS Frequency Synthesizer Design", 1998.
Cunningham, "Rascal Telecom-Company Report Scrimgeour Vickers", Feb. 17, 1989, Investext Report No. 908246, p. 4.
Davis et al., "Filtered Spreading Sequences For Interference Avoidance", IEEE—ICUPC '92 Proceedings, Sep. 29-Oct. 2, 1992, pp. 54-58.
Didner, "Data Goes Mobile", Telephony, Mar. 11, 1991, vol. 220, No. 10, pp. 24-25.

Didner, "The Next Step In Mobile Communications", Telecommunications, Dec. 1990, vol. 24, No. 12, p. 48-50.

Dommety et al., "Flat Location Management Scheme For PCNs", 1997.

Dube et al., "Signal Stability Based Adaptive Routing (SSA) For Ad-Hoc Mobile Networks", IEEE Personal Communication, Aug. 26, 1996, pp. 1-22.

Duet, "An Assessment Of Duplexing Methods For The Radio Links Of Personal Communication Systems", IEEE—ICUPC '92 Proceedings, Sep. 29-Oct. 2, 1992, pp. 131-135.

Earnshaw, "The Topology Discovery Service", Feb. 18, 1993, pp. 111-118.

Edwards, "Simware Targets Software AT RF Wireless Market", Computing Canada, Nov. 7, 1991, vol. 17, No. 23, p. 53.

Egan et al., "City Of Dallas Fire Department Purchases $4 Million Ericsson GE Communications System", Business Wire, San Francisco, Oct. 16, 1991.

Egan et al., "Ericsson And GE Form Mobile Communications Joint Venture", Business Wire, San Francisco, Aug. 24, 1989, p. 1.

Egan et al., "McCaw Cellular, LIN Broadcasting To Rebuild Cellular Systems In N.Y., N.J. Pacific Northwest With Ericsson GE Equipment", Business Wire, San Francisco, Oct. 3, 1990, p. 1.

Egan et al., "SaskTel Purchases New Ericsson GE Communications System To Serve Saskatchewan", Business Wire, San Francisco, Oct. 23, 1991, p. 1.

Egan, "Ericsson Signs Breakthrough Agreement for Mobile Data Network", Business Wire, San Francisco, May 31, 1989, p. 1.

Elson et al., "Fine-Grained Network Time Synchronization Using Reference Broadcasts", May 17, 2002, pp. 1-14.

Eng et al., "A Wireless Broadband Ad-Hoc ATM Local-Area Network", Wireless Networks 1, 1995, pp. 161-174.

Epstein,"Indigenous Switching", Industry Report: Arthur D. Little Decision Resources, Incorporated, Jul. 1, 1987, Investex Report No. 938157, p. 6.

Ergen et al., "MEWLANA-Mobile IP Enriched Wireless Local Area Network Architecture", Proc. Of IEEE Vehicular Technology Conference (Vancouver), Mar. 2002, vol. 4, pp. 2449-2453.

Fenner, Mobil Address Management And Billing For Personal Communications, IEEE—ICUPC '92 Proceedings, Sep. 29-Oct. 2, 1992, pp. 253-257.

Foyil, "Nokia—Company Report: UBS Phillips & Drew Global Research Group", Oct. 8, 1990, Investext Report No. 1034219, p. 2.

Frangini, "Rogers Cantel Lauches 'Public Access' Mobile Network", Computing Canada, Jun. 7, 1990, vol. 16, No. 12, p. 53.

Fraser, "The Mobitex Terminal Specification", Communications, Jul. 1991, vol. 28, No. 7, pp. 33-38.

Fraser, "The MTS—Part II", Communications, Aug. 1991, vol. 28, No. 8, pp. 52-55.

Fudge, "Third Generation Mobile Systems—What They Will Do And Who Decide", IEEE—ICUPC '92 Proceedings, Sep. 29-Oct. 2, 1992, pp. 433-442.

Gates, "Computers Enter The Wireless Age: New Technology Can Link Terminals Spanning Globe", Financial Post, Jun. 8, 1991, p. 13.

Ghassemian, "Evaluation Of Different Handoff Schemes For Cellular IP", Master's Thesis, Kings College, London, 2001.

Goldberg, "Systems Engineering And Program Management for Personal Communications In T1P1", IEEE—ICUPC '92 Proceedings, Sep. 29-Oct. 2, 1992, pp. 151-157.

Goodman, "Cellular Packet Communications", IEEE Transactions On Communications, Aug. 1990, vol. 38, No. 8.

Gross, "Telephone Lines—Industry Report, Donaldson, Lufkin & Jenrette Securities", Industry Report, Nov. 11, 1991, Investext Report No. 1149341, p. 14.

GSM Program Management Information, GSM 87/88, Apr. 22, 1998.

Haber, "The Art Of Wireless Computing", Midrange Systems, Aug. 6, 1991, vol. 4, No. 16, p. 66.

Hasselberg, "Mobitex Permits Tailored Telecom", Tele (English Edition), No. 2., 1988, vol. XXXXI, pp. 14-16.

Haug et al., "Microcellular Radio Performance In A Rayleigh/Rician CoChannel Interference Environment", IEEE—ICUPC '92 Proceedings, Sep. 29-Oct. 2, 1992, pp. 112-115.

Hayes et al., "Personal Satellite Communications Utilizing The KA-Band", IEEE—ICUPC '92 Proceedings, Sep. 29-Oct. 2, 1992, pp. 385-390.

Hightower et al., "Design and Calibration Of The SpotON Ad-Hac Location Sensing System", Aug. 2001, pp. 1-18.

Hines, "LM Ericsson—Company Report: Paine Webber Inc.", Dec. 10, 1991, Investext Report No. 1153781, p. 9.

Hirschman, "Service Mobility/Transparency For Personal Communications", IEEE—ICUPC '92 Proceedings, Sep. 29-Oct. 2, 1992, pp. 334-338.

Ho, "Effects Of Antenna Polarization And Beam Pattern On Multipath Delay Spread And Path Loss In Indoor Obstructed Wireless Channels", IEEE—ICUPC '92 Proceedings, Sep. 29-Oct. 2, 1992, pp. 92-96.

Hodes et al., "Composable Ad-Hoc Location-Based Services For Heterogeneous Mobile Clients", Wireless Networks, 1989, vol. 5, pp. 411-427.

Honcharenk et al., "Theoretical Prediction Of UHF Propagation Within Office Buildings", IEEE—ICUPC '92 Proceedings, Sep. 29-Oct. 2, 1992, pp. 102-105.

Huang et al., "OPNET Simulation Of A Multi-Hop Self-Organizing Wireless Sensor Network", Florida Communication Research Labs, Motorola Labs, Fort Lauderdale, FL 33322, 2002.

Hunt, "The Regulatory Environment For Personal Communications In The Post-WARC-92 Period", IEEE—ICUPC '92 Proceedings, Sep. 29-Oct. 2, 1992, pp. 429-432.

Ioannidis et al., "IP-Based Protocols For Mobile Internetworking", Proceedings Of Conference On Communications Architecture & Protocols, 1991, pp. 1-17.

Ioannidis et al., "IP-Based Protocols For Mobile Internetworking", Proceedings Of Conference On Communications Architecture & Protocols, 1991, pp. 235-245.

Jain, "Characteristics Of Destination Address Locality In Computer Networks: A Comparison Of Caching Schemes", Jun. 25, 1990.

Jakobs et al., "Electronic Mail In Broadcast Networks", IEEE—ICUPC '92 Proceedings, Sep. 29-Oct. 2, 1992, pp. 412-416.

Jalali et al., "Performance Of Data Protocols For In-Building Wireless Systems", IEEE—ICUPC '92 Proceedings, Sep. 29-Oct. 2, 1992, pp. 407-411.

Jetcheva et al., "Adaptive Demand-Driven Multicast Routing In Multi-Hop Wireless Ad Hoc Networks", Proceedings Of The 2nd ACM International Symposium On Mobile Ad-Hoc Networking & Computing (Long Beach Session: Routing And Transport), 2001, pp. 33-44.

Johansson et al., "Scenario-Based Performance Analysis Of Routing Protocols For Mobile Ad-Hoc Networks", Proceedings Of The 5th Annual ACM/IEEE International Conference On Mobile Computing and Networking (Seattle), 1999, pp. 195-206.

Johansson, "The Mobitex Experience", Paper Presented At International Mobile Communications (London 1990), Jun. 1990, pp. 55-68.

Jung et al., "A Power Saving MAC Protocol For Wireless Networks", Department Of Computer Science, Texas A&M University, Technical Report, Jul. 2002.

Jung et al., "An Energy Efficient MAC Protocol For Wireless LAN's", Department Of Computer Science, Texas A&M University, Technical Report TR01-017, Jul. 31, 2001.

Kaplan, "The Network In Your Pocket", Business Communications Review, Mar. 1991, vol. 21, No. 3, p. 112.

Karp et al., "GPSR: Greedy Perimeter Stateless Routing For Wireless Networks", Proceedings Of the 6th Annual International Conference On Mobile Computing And Networking (Boston), 2000, pp. 243-254.

Karp, "Geographic Routing For Wireless Networks", PhD Thesis, Harvard University, Oct. 2000.

Katz, "The Use Of Connectionless Network Layer Protocols Over FDDI Networks," ACM SIGCOMM Computer Communication Review, vol. 20(3), 1990, pp. 32-45.

Kay, "Extended-TDMA™ A High Capacity Evolution Of U.S. Digital Cellular", IEEE—ICUPC '92 Proceedings, Sep. 29-Oct. 2, 1992, pp. 182-184.

Kearns, "Scope Of ZENworks 7 Suite Stretches Far And Wide", Network World, (http://www.networkworld.com\newsletters\netware\2005\0829nw1.html), Aug. 30, 2005.

Khandani et al., "ISI-Reduced Modulation Over A Fading Multipath Channel", IEEE—ICUPC '92 Proceedings, Sep. 29-Oct. 2, 1992, IEEE—ICUPC '92 Proceedings, Sep. 29-Oct. 2, 1992, pp. 288-292.

Kiang, "Characteristics Of Two-Alternative Frequency Channel Assignment Methods For TDMA Wireless Access Systems", IEEE—ICUPC '92 Proceedings, Sep. 29-Oct. 2, 1992, pp. 355-358.

Kiang, "Geometrical Ray Tracing Approach For Indoor Wave Propagation In A Corridor", IEEE—ICUPC '92 Proceedings, Sep. 29-Oct. 2, 1992, pp. 106-111.

Kikuta, "Global UPT Architecture With International Mobility Management", IEEE—ICUPC '92 Proceedings, Sep. 29-Oct. 2, 1992, pp. 229-235.

Kilpatrick, "Mobile Packet-Switched Data Networks", RF Expo East, Orlando, FL, Oct. 29-31, 1991, pp. 367-369.

Kim, "KBLCOM Eyes Automated Customer Service System", Multichannel News, Mar. 25, 1991, p. 102.

Kleeman, "Optimal Estimation Of Position And Heading For Mobile Robots Using Ultrasonic Beacons And Dead-Reckoning", Proceedings Of The 1992 IEEE International Conference On Robotics And Automation (Nice, France), 1992.

Krashinsky et al., "Minimizing Energy For Wireless Web Access With Bounded Slowdown", 2002, Proc. ACM Mobicon 02:119-130.

Krechmer, "A Review Of US Mobile Communications Standards", Telecommunications, Jul. 1991, vol. 25, No. 7, p. 43-45.

Kriz et al., "Spread Spectrum Indoor Video Transmission", IEEE—ICUPC '92 Proceedings, Sep. 29-Oct. 2, 1992, pp. 421-425.

Ku, "The Outlook Of DCS 1800 For Personal Communications Networks", IEEE—ICUPC '92 Proceedings, Sep. 29-Oct. 2, 1992, pp. 168-171.

Kubo et al., "Simulated Tolerance Of Loop Parameters Of Cartesian Feedback Amplifier For π/4—Shifted QPSK Transmitter", IEEE—ICUPC '92 Proceedings, Sep. 29-Oct. 2, 1992, pp. 136-140.

Kumar, "Antennas For MSAT Ground Terminals", IEEE—ICUPC '92 Proceedings, Sep. 29-Oct. 2, 1992, pp. 219-223.

Kwok, "Wireless Networking Requirments Of Multimedia Applications", IEEE—ICUPC '92 Proceedings, Sep. 29-Oct. 2, 1992, pp. 402-406.

Lambert, "Security For Universal Personal Communications", IEEE—ICUPC '92 Proceedings, Sep. 29-Oct. 2, 1992, pp. 44-48.

Larsen, "Marketing Mobile Data Services And Equipment", Proceedings Of Cellular & Mobile Communications 88, Nov. 1988, pp. 111-116.

Larsen, "Mobitex—A System For Mobile Data Communication", Information Network And Data Communication, III, Proceedings Of The IFIP TC6 International Conference On Information Network And Data Communication, Lillehammer, Norway, Mar. 1990, pp. 239-247.

Larsen, "Mobitex—Public Mobile Radio Service", Communications International, Oct. 1986, vol. 13, Pt. 10, p. 96.

Lau et al., "Interworking Of Satellite And Terrestrial Networks For Land Mobile Communications", IEEE—ICUPC '92 Proceedings, Sep. 29-Oct. 2, 1992, pp. 375-379.

Laval et al., "Cognito Network Overview", Cognito Group Limited, Sep. 19, 1990.

Laval, "Briefing Document For A Brochure On The Cognito Mobile Messaging Service", Cognito Group Limited, May 22, 1990.

Lawson-Jenkins, "The Role of GSM In The Development Of Standards For A Worldwide Personal Communication Network", IEEE—ICUPC '92 Proceedings, Sep. 29-Oct. 2, 1992, pp. 79-81.

Leibowitz et al., "Rogers Cantel Mobile Communications Inc. —Company Report", Donaldson, Lufkin & Jenrette Securities, Investext Report No. 1145153, Oct. 15, 1991.

Lin et al., "A Two-Stage Maximum Likelihood Sequence Estimation Technique And Its Application To Data Transmission Protocol In Digital Cellular Radio", IEEE—ICUPC '92 Proceedings, Sep. 29-Oct. 2, 1992, pp. 303-307.

Linnartz et al., "Performance Of Personal Communication Networks With Error Correction Coding In Microcellular Channels", IEEE—ICUPC '92 Proceedings, Sep. 29-Oct. 2, 1992, pp. 308-313.

Lo et al., "An Estimate Of Network Database Transaction Volume To Support Personal Communications Services", IEEE—ICUPC '92 Proceedings, Sep. 29-Oct. 2, 1992, pp. 236-241.

Ioannidis et al., "The Design And Implementation Of A Mobile Internetworking Architecture", 1993 Winter USENIX, San Diego, CA, Jan. 25-29, 1993, pp. 489-500.

Loberg et al., "Mobitex—The New Swedish Cellular Mobile Radio Service", International Conference On Radio Receivers & Associated Systems (4$^{th}$ 1986), 1986, Pub. No. 68, pp. 77-82.

Loberg et al., "Mobitex Brings A New Look To Dispatch Communications", Communications International, Feb. 1985, vol. 12, No. 2, pp. 25-32.

Long et al., "Rapid Prototyping Of Mobile Context-Aware Applications: The Cyberguide Study", Proceedings Of the 2nd Annual International Conference On Mobile Computing And Networking, (Rye, NY), 1996.

Loudermilk, "Trio Throws Weight Behind Radio E-Mail Technology", PC Week, Dec. 2, 1991, vol. 8, No. 48, p. 39.

Lusa, "The ITU's Quadrennial Telecom Show In Geneva Attracts And Dazzles Thousands", Networking Management, Dec. 1991, vol. 9, No. 14, pp. 12-14.

Lycksell, "Mobitex: A New Radio Communication System For Dispatch Traffic", Tele (English Edition), 1983, vol. 35, Issue 1, pp. 68-75.

Madhow, "Minimum Mean Squared Error Interference Suppression For Direct-Sequence Spread-Spectrum Code-Division Multiple-Access", IEEE—ICUPC '92 Proceedings, Sep. 29-Oct. 2, 1992, pp. 273-277.

Malyan et al., "A Wireless Personal Communications Architecture For Urban Areas", IEEE—ICUPC '92 Proceedings, Sep. 29-Oct. 2, 1992, pp. 116-120.

Mandell et al., "A Comparison Of CDMA And Frequency Hopping In A Cellular Environment", IEEE—ICUPC '92 Proceedings, Sep. 29-Oct. 2, 1992, pp. 172-176.

Maric et al., "Microcell Planning And Channel Allocation For Manhattan Street Environments", IEEE—ICUPC '92 Proceedings, Sep. 29-Oct. 2, 1992, pp. 359-363.

Mathy et al., "An Overlay Tree Building Protocol", J. Crowcroft And M. Hoffman (Eds.) Springer-Verlag Berlin Heidelberg, 2001, pp. 76-87.

McIlwain et al., "Routing Technology Software Inc. And Ericsson GE Team Up To Provide 'Roadshow' Routing Application To Mobitex Networks Worldwide", Business Wire, San Francisco, Jun. 6, 1991, p. 1.

"Mobile Radio Interface Layer 3 Specification", Recommendation GSM 04.08, v. 3.3.1, Apr. 1989.

Mokhtar et al., "Capacity For Cellular CDMA PCS's In Nakagami Fading Log-Normal Shadowing Channels", IEEE—ICUPC '92 Proceedings, Sep. 29-Oct. 2, 1992, pp. 190-194.

Morrison et al., "Statistical Analysis And Autoregressive Modeling Of The Indoor Radio Propagation Channel", IEEE—ICUPC '92 Proceedings, Sep. 29-Oct. 2, 1992, pp. 97-101.

Mulqueen, "Mobile Data Network Debuts", Data Communications, Jan. 1991, p. 78.

Murphy et al., "UPT: Mobility vs. Portability", IEEE—ICUPC '92 Proceedings, Sep. 29-Oct. 2, 1992, pp. 224-228.

Murthy et al., "A Routing Protocol For Packet Radio Networks", Proceedings Of The 1st Annual International Conference On Mobile Computing and Networking (Berkeley), 1995, pp. 86-95.

Murthy et al., "An Efficient Routing Protocol For Wireless Networks", Mobile Networks And Applications 1, 1996, pp. 183-197.

Nakajima et al., "Intelligent Network Architecture For Personal Mobile Telecommunication", IEEE—ICUPC '92 Proceedings, Sep. 29-Oct. 2, 1992, pp. 339-344.

Nichols, "LM Ericsson—Company Report: Prudential Securities Inc.", Oct. 11, 1990, Investext Report No. 1035361, p. 19.

Nikaein et al, "DDR-Distributed Dynamic Routing Algorithm For Mobile Ad Hoc Networks", Proc. Of The 1st Annual ACM International Symposium On Mobile Ad Hoc Networking & Computing (Boston), Session A, 2000, pp. 19-27.

Noel et al., "The Development Of An 8 KBPS GMSK-Like Modem For Mobitex", IEEE Pacific Rim Conference On Communications, Computers And Signal Processing, May 9-10, 1991, vol. 2, pp. 791-794.

Noerpel, "Hybrid Signaling For The Air Interface For A Wireless Access Communication System", IEEE—ICUPC '92 Proceedings, Sep. 29-Oct. 2, 1992, pp. 49-53.

O'Byrne, "Digital Cellular Over The Cable Television Fiber-Optic Plant", IEEE—ICUPC '92 Proceedings, Sep. 29-Oct. 2, 1992, pp. 205-208.

Pande et al., "Application Of Wireless Access To Telecommunication Services In Developing Countries", IEEE—ICUPC '92 Proceedings, Sep. 29-Oct. 2, 1992, pp. 82-86.

Perlman, "An Algorithm For Distributed Computation Of A Spanning Tree In An Extended LAN", Proceedings Of The Ninth Symposium On Data Communications (Whistler Mountain, British Columbia, Canada), 1985, pp. 44-53.

Perlman, "Incorporation of Multiaccess Links Into A Routing Protocol", Proceedings Of The Eighth symposium On Data Communications (North Falmouth, MA), 1983, pp. 85-94.

Pouwelse et al., "Power Consumption Trade-Offs For Wireless Audio Access", Delft University Of Technology, 2000.

Powell, "Cellular Telephones Give Way To Mobile Communications", Communications Canada, Jun. 22, 1989, p. 35.

Powell, "Use Cellular To Support Datacom Applications", Networking Management, Apr. 1991, vol. 9, No. 5, pp. 30-34.

Prakash, "A Routing Algorithm For Wireless Ad Hoc Networks With Unidirectional Links", Wireless Networks, 2001, vol. 7, pp. 617-625.

Prakash, "Unidirectional Links Prove Costly In Wireless Ad Hoc Networks", Proceedings Of The 3rd International Workshop On Discrete Algorithms And Methods For Mobile Computing And Communication (Seattle), 1999, pp. 15-22.

Preston, "Ericsson, GE Form Mobile Venture", Communications Week International, Aug. 21, 1989, No. 25, p. 9.

Priyantha et al., "The Cricket Compass For Context-Aware Mobile Applications", Proceedings Of The 7th Annual International Conference On Mobile Computing And Networking (MOBICOM 2000), 2001, pp. 1-14.

Purton, "BT Admits Impact Of Recession But Still Manages To Improve Results", Europe 2000—Communications & Information Technology, vol. 3, No. 7, pR 93(1), Sep. 1991.

Ramesh et al, "Spectral Shaping Using Coded Modulation For Mobile Radio", IEEE—ICUPC '92 Proceedings, Sep. 29-Oct. 2, 1992, pp. 298-302.

Reinbold et al., "A Comparison Of IP Mobility Protocols", Tech. Rep. Infonet-TR-13, Dec. 2001.

Reiter, "Three Cellular Modems", PC Magazine, Dec. 25, 1990, vol. 9, No. 22, p. 365.

Rodrigues et al., "Rural Satellite Service: A Mexican View", IEEE—ICUPC '92 Proceedings, Sep. 29-Oct. 2, 1992, pp. 380-384.

Rohani et al., "Low Cost High Performance CDMA System For U.S. PCS", IEEE—ICUPC '92 Proceedings, Sep. 29-Oct. 2, 1992, pp. 278-282.

Röhl et al., "A Short Look On Power Saving Mechanism In The Wireless LAN Standard" Draft IEEE 802.11, 1997, pp. 1-6.

Royer et al., "Multicast Operation Of The Ad-Hoc On-Demand Distance Vector Routing Protocol", Proceedings Of the 5th Annual ACM/IEEE International Conference On Mobile Computing And Networking (Seattle), 1999, pp. 207-218.

RPM Native Mode Interface R1.1.1 Reference Manual, May 1, 1992.

Salkintzis et al., "Mobile Packet Data Technology: An Insight Into MOBITEX Architecture," IEEE Personal Communications, Feb. 1997, pp. 10-18.

Sanford et al., "Facade Integrated Microstrip Patch Antennas Applied To Personal communication Networks", IEEE—ICUPC '92 Proceedings, Sep. 29-Oct. 2, 1992, pp. 214-218.

Savage, "A Technology To Link Professionals On The Road To Central Information Systems: Mobitex Public Networks In Europe", World Congress On Applications Of Transport Telematics And Intelligent Vehicle-Highway Systems, 1995, vol. 5, pp. 2662-2668.

Schwartz, "Ericsson Set To Debut Radio Modems", Communications Week, Dec. 2, 1991, p. 21.

Seshan et al., "The Role Of Digital Signal Processing In Personal Communications Networks", IEEE—ICUPC '92 Proceedings, Sep. 29-Oct. 2, 1992, pp. 200-204.

Seshan, "Low-Latency Handoff For Cellular Data Networks", Ph.D. Thesis, University Of California At Berkeley, 1995.

Sheety et al., "Development In Mobile Markets", Communications International, Dec. 1991, vol. 18, No. 12, p. 47.

Sneed, "A 2-GHz CMOS LC-Tuned VCO Using Switched-Capacitors To Compensate For Bond Wire Inductance Variation", University Of California, Berkeley, Dec. 21, 2000, pp. 1-51.

Sollenberger et al., "An Efficient TDMA Radio Link And Architecture For Wireless Local Access", IEEE—ICUPC '92 Proceedings, Sep. 29-Oct. 2, 1992, pp. 262-266.

Srisathapornpat et al., "Coordinated Power Conservation For Ad Hoc Networks", IEEE International Conference On Communications, 25(1), 2002, pp. 3330-3335.

Stein, "Greater Efficiency With Mobile Data Communication", Ericsson Review, 1991, vol. 68, Issue 4, pp. 104-110.

Steinert-Threlkeld, "Ericsson Unit To Aid New Network; Richardson Firm To Provide Equipment For Cellular Data Link", The Dallas Morning News, Record No. DAL1073150, Jun. 1, 1989.

"Subscriber Identity Modules, Functional Characteristics", Recommendation GSM 02.17, v. 3.2.0, Mar. 1990.

Sudame et al., "On Providing Support For Protocol Adaptation In Mobile Wireless Networks", Mobile Networks And Applications 6, 2001, pp. 43-55.

Sweeny, "IBM Motorola Join To Offer Mobile Data", Communications Week, Feb. 5, 1990, vol. 286, pp. 2, 84.

Takats et al., "A Network Management Architecture For Satellite Based Personal Communications", IEEE—ICUPC '92 Proceedings, Sep. 29-Oct. 2, 1992, pp. 395-401.

Tan et al., "A Fast Handoff Scheme For Wireless Networks", Proceedings Of The 2nd ACM International Workshop On Wireless Mobile Multimedia (Seattle, WA), 1999.

Tan et al., "Mobicast: A Multicast Scheme For Wireless Networks", Mobile Networks And Applications 5, 2000, pp. 259-271.

Tanno et al., "Multiplexing Of Communication Ports On Unix Terminals For Packet Radio Networks", IEEE—ICUPC '92 Proceedings, Sep. 29-Oct. 2, 1992, pp. 417-420.

Technical Manual Callmaster/Smart MT-270, 1982.

Thorborg et al., "Mobimed—A Telemedicine System For Mobile Monitoring Of Physiological Parameters", Telecommunication For Health Care: Telemetry, Teleradiology, And Telemedicine 1990, Proceedings Of IEEE Western Canada Conference And Exhibition, Jul. 6-7, 1990, SPIE, vol. 1355, pp. 32-35.

Todd et al., "Low Power Rendezvous In Embedded Wireless Networks", Proceedings Of The 1st ACM International Symposium on Mobile Ad Hoc Networking & Computing (Boston), Sessions D, 2000, pp. 107-118.

Todd et al., "Space And Frequency Diversity Measurements of The 1.7 GHz Indoor Radio Channel For Wireless Personal Communications", IEEE—ICUPC '92 Proceedings, Sep. 29-Oct. 2, 1992, pp. 87-91.

Toh, "A Hybrid Handover Protocol For Local Area Wireless ATM Networks", Mobile Networks And Applications 1, 1996, pp. 313-334.

Troe, "Mobile-Data Packet-Networks", Electro International Conference Record, New York, Apr. 16-18, 1991, pp. 510-513.

Tsukamoto et al., "Mobility Management Of Transport Protocol Supporting Multiple Connections", Proceedings Of The Second International Workshop On Monthly Management & Wireless Access Protocols (Philadelphia, PA), Sessions 4, 2004, pp. 83-87.

Ubiquity 1000 Cellular Communications System—Technical Information, May 18, 1994.

Ubiquity 1000 Cellular Communications System For Your IBM ThinkPad™ 750, User's Guide, 1994.

Valko et al., "On The Analysis Of Cellular IP Access Networks", Sixth JFIP International Workshop On Protocols For High Speed Networks (Salem), Aug. 25-27, 1999.

Velocci, "Orbcomm Nears Full Operational Status", Aviation Week & Space Technology, Nov. 23, 1998, vol. 149, No. 21, pp. 46-78.

Vijayan et al., "The Dynamic Behavior Of Handoff Algorithms", IEEE—ICUPC '92 Proceedings, Sep. 29-Oct. 2, 1992, pp. 39-43.

Vinton, "Cellular Market Booms, But Competition Looms", Business Communications Review, Aug. 1990, vol. 20, No. 8, p. 73-77.

Vizard, "Standards For UPT Introduction and Evolution", IEEE—ICUPC '92 Proceedings, Sep. 29-Oct. 2, 1992, pp. 74-78.

Wang et al., "On Frequency-Hop Multiple Access Sequence", IEEE—ICUPC '92 Proceedings, Sep. 29-Oct. 2, 1992, pp. 177-181.
Wang et al., "Tracking A Head-Mounted Display In A Room-Sized Environment With Head-Mounted Cameras", Proc. Of Helmet-Mounted Displays II, Orlando, FL, Apr. 19-20, 1990, vol. 1290 SPIE.
Wang, "The Hierarchical Structure Of Tracing Strategy For Universal Personal Communication Systems", IEEE—ICUPC '92 Proceedings, Sep. 29-Oct. 2, 1992, pp. 242-246.
Want et al., "The Active Badge Location System", ACM Transactions On Information Systems, Jan. 1992, vol. 10, No. 1, pp. 91-102.
Webb, "Voice And Data Privacy Using Chaotic Time Sequences", IEEE—ICUPC '92 Proceedings, Sep. 29-Oct. 2, 1992, pp. 33-38.
Wilber-Ham et al., "Universal Personal Telecommunication (UPT) Service And Architecture Overview", IEEE—ICUPC '92 Proceedings, Sep. 29-Oct. 2, 1992, pp. 64-68.
Williams, "It's Telecom All The Way For A Rejuvenated Ericsson (LM Ericsson of Sweden Sticks To Telecommunications Business)", Electronic Business Buyer, Jul. 10, 1989.
Wilson et al., "CDMA Versus Dynamic TDMA For Access Controls In An Integrated Voice/Data PCN", IEEE—ICUPC '92 Proceedings, Sep. 29-Oct. 2, 1992, pp. 267-272.
Winters et al., "The Capacity Of Wireless Communication Systems Can Be Substantially Increased By The Use Of Antenna Diversity", IEEE—ICUPC '92 Proceedings, Sep. 29-Oct. 2, 1992, pp. 28-32.
Wolter, "Multiplexing On The Downlink Of A TDMA-Based Radio System", IEEE—ICUPC '92 Proceedings, Sep. 29-Oct. 2, 1992, pp. 258-261.
Wolterink, "Handoff, A Necessary Feature In Wireless Office Systems", IEEE—ICUPC '92 Proceedings, Sep. 29-Oct. 2, 1992, pp. 369-374.
Woolnough, "Ericsson Pushes Mobile Data Standard", Electronic Engineering Times, Jan. 9, 1989, vol. 520, p. 18.
Woolnough, "Finnish Farm Has Mixed Results Building Through Acquistions: Nokia Finds Fast Track Has Its Bumps", Electronic Engineering Times, Oct. 29, 1990, vol. 614, p. 85-86.
Wu et al., "AMRIS: A Multicast Protocol For Ad Hoc Wireless Networks", Proceedings of IEEE MILCOMM'99 (Atlantic City, NJ), 1999, pp. 1-5.
Yamagishi et al., "A Low-Voltage 6-GHZ-Band CMOS Monolithic LC-Tank VCO Using A Tuning-Range Switching Technique", IEEE, MTT-S Digest, 2000, pp. 735-738.
Yu, "IS-41 For Mobility Management", IEEE—ICUPC '92 Proceedings, Sep. 29-Oct. 2, 1992, pp. 158-162.
Lin et al., "A 900 MHz, 2.5mA CMOS Frequency Synthesizer With An Automated SC Tuning Loop", Elec. Eng. Dept. UCLA, pp. 375,378.
"Ericsson And General Electric Going Mobile", Telephone Engineer & Management News, Oct. 1, 1989, pp. 30-39.
"Mobile Station Features", Recommendation GSM 4.4.2, Oct. 1993.
"Mobilt Datanät om tvåår" (Mobile Datanet In Two Years), Elteknik Med. Ektuell Electronik, 1985, V. 5, p. 6.
"Proposed EAI,TIA Standard, Cellular System CDMA-Analog Dual-Mode Mobile Station—Base Station Compatibility Standard, Rev. 1.14", Apr. 21, 1992.
"Random Access Procedures", GSM 04.06, v. 3.6.0.
"Release Note, Recommendation" GSM 03.20, v. 3.3.2, Jan. 1991.
"Release Note, Recommendation", GSM 02.07, v. 3.3.0, Mar. 1990.
"Release Note, Recommendation", GSM 02.30, v. 3.5.0, Mar. 1990.
"Trögt för Motitex" (Delays For Mobitex), Elteknik Med. Aktuell Elektronok, 1987, vol. 3, pp. 19-21.
Agere v. Broadcom Jul. 20, 2004 Memorandum & Order, Bates Nos. BCMITC0000025673-667.
Balston, Cellular Radio Systems, 1993.
Broadcom's Third Supplemental Objections and Responses To Qualcomm's First Set Of Interrogatories (1-53), Nov. 7, 2005.
Cellular Digital Packet Data System Specification Release 10—Book 1, N/A, Jul. 19, 1993.
Cellular System Dual-Mode Station—Base Station Compatibility Standard, EIA/TIA/IS-54, May 1, 1990.
Change Request (Phase 2) Nos. 17, Tdoc GSM 195/93, Feb. 1992, Bates Nos. QBB222315-319.

ESTI Radio Equipment And Systems (RES); Digital Equipment Cordless Telecommunications (DECT) Common Interface Part 1: Overview, ETS 300 175-1, Oct. 1, 1992.
ESTI Radio Equipment And Systems (RES); Digital Equipment Cordless Telecommunications (DECT) Common Interface Part 2: Physical Layer, ETS 300 175-2, Oct. 1, 1992.
ESTI Radio Equipment And Systems (RES); Digital Equipment Cordless Telecommunications (DECT) Common Interface Part 3: Medium Access Control Layer, ETS 300 175-3, Oct. 1, 1992.
ESTI Radio Equipment And Systems (RES); Digital Equipment Cordless Telecommunications (DECT) Common Interface Part 4: Data Link Control Layer, ETS 300 175-4, Oct. 1, 1992.
ESTI Radio Equipment And Systems (RES); Digital Equipment Cordless Telecommunications (DECT) Common Interface Part 6: Identities And Addressing, ETS 300 175-6, Oct. 1, 1992.
ESTI Radio Equipment And Systems (RES); Digital Equipment Cordless Telecommunications (DECT) Common Interface Part 7: Security Features, ETS 300 175-7, Oct. 1, 1992.
ESTI Radio Equipment And Systems (RES); Digital Equipment Cordless Telecommunications (DECT) Common Interface Part 8: Speech Coding And Transmission, ETS 300 175-8, Oct. 1, 1992.
ESTI Radio Equipment And Systems (RES); Digital Equipment Cordless Telecommunications (DECT) Common Interface Part 9: Public Access Profile, ETS 300 175-9, Oct. 1, 1992.
ETSI Handbook Guide To The Application Of The PNE Rule To The Drafting And Presentation Of ETSI Standards v 1.3, May 1990.
Fast And Scalable Handoffs For Wireless Internet Works, Proceedings Of The 2nd Annual International Conference On Mobile Computing And Networking (Rye, NY), 1995, pp. 56-66.
File History of U.S. Appl. No. 08/027,140, Bates Nos. BCMITC000089531-664.
File History of U.S. Appl. No. 08/101,254, Bates Nos. BCMITC0000793836-978.
File History of U.S. Appl. No. 08/114,872, Bates Nos. QBB220620-1242.
File History of U.S. Appl. No. 08/431,077, Bates Nos. BCMITC000079534-862.
File History of U.S. Appl. No. 08/487,609, Bates Nos. BCMITC0000792166-658.
File History of U.S. Appl. No. 08/513,648 ('983 file history), Bates Nos. BCMITC000071666-72400.
File History of U.S. Appl. No. 09/060,287 ('311 file history), Bates Nos. BCMITC000071327-71665.
General on Terminal Adaptation Functions For The MSs, GSM 07.01 v 3.14.0, Apr. 1, 1992.
GSM PLMN Connection Types, GSM 03.10 v 3.3.0, Feb. 1992.
Haine, "A New Radio Access Protocol And Network Architecture For Mobile Packet Data", Proc. Of Vehicular Technology Conference, May 19-22, 1991, pp. 399-407.
Henderson, "Public Data Networks: The Mobitex System", Paper Presented At The IEEE Vehicle Navigation And Information Systems Conference (VNIS '89), 1989, pp. 365.
Introduction To Telephones And Telephone Systems, 3rd Edition, 1998.
Landmobile And Marine Radio Technical Handbook, 1985.
Lee, Mobile Cellular Telecommunications Systems, 1989, Bates Nos. QBB147008-463.
List of Change Request Presented To SMH Plenary No. 6, Rev 1, SMG 305-93, Mar. 29, 1993.
Lycksell, "Mobitex, ett kommunikations-radionät för text, data och tal" (A Radio Communication Network For Text, Data And Speech), 1986.
Mobile Information Systems, 1990.
Mobile Radio Interface Layer 3 Specification, GSM 04.08 v 4.2.0, Oct. 1992, Bates Nos. QBB479485-977.
Mobile Radio Interface Layer 3 Specification; Core Network Protocols; Stage 3, ETSI TS 124008 v. 5.3.0, 2002.
Mobile Station—Land Station Compatibility Specification, EIA/TIA-553, Sep. 1, 1989.
Mouly, The GSM System For Mobile Communications, 1992.

Radio Equipment And Systems (RES); Digital ESTI Radio Equipment And Systems (RES); Digital Equipment Telecommunications (DECT) Common Interface Part 5: Network Layer, ETS 300 175-5, Oct. 1, 1992.

Radiodetermination Satellite Services And Standards, 1987.

Recommended Minimum Performance Standards For 800 MHz Dual mode Mobile Stations, EIA/TIA/IS-55, Dec. 1, 1991, Bates Nos. QBB149924-150025.

Service Accessibility—Change Request, GSM 02.11 v 3.6.0, Jan. 14, 1992.

Service Accessibility—Change Request, GSM 02.11 v 4.0, Feb. 6, 1992.

Service Accessibility—GSM 02.11 v 4.3.0, Oct. 1992.

Service Accessibility—GSM 02.11 v 4.5.0, Apr. 1993, Bates Nos. QBB153507-515.

Service Accessibility, ETSI TS 122 011 v 6.4.0.

Smart RF Wireless Data Microtransmitter AT86RF401, 1998.

SMH Meeting Report, Doc 255/92, Mar. 30, 1992.

Speech Processing Functions: General Description, GSM 06.01 v 3.0.0, Feb. 1992.

STEMM, "Vertical Handoffs In Wireless Overlay Networks", Mobile Networks And Applications 3, 1998, Abstract.

Sweden, Telecommunications (International Edition), 1991, vol. 25, No. 10, pp. 145-148.

Technical Realization Of The Short Message Service—Point-to-Point, GSM 03.40 v. 3.5.0, Feb. 1992.

TIA-856 Spec.

Types Of Mobile Stations, GSM 02.06 v 3.2.0, Feb. 1992.

Biba, *A Hybrid Wireless MAC Protocol Supporting Asynchronous and Synchronous MSDU Delivery Services*, IEEE P802.11/91-92.

Cheah, *A Proposed Architecture and Access Protocol Outline for the IEEE 802.11 Radio LAN Standards, Part II*, Document IEEE P802.11/91-54.

Cox, A Radio System Proposal for Widespread Low-Power Tetherless Communications, *IEEE Transactions on Communications*, vol. 39, No. 2 (Feb. 1991).

Natarajan et al., *Battery Efficient Operation of Radio MAC Protocol*, Document IEEE P802.11/91-102.

Rypinski, *Power-Drain Considerations for Full Time and Sleep Mode Radio Receivers*, Document IEEE P802.11/91-99.

Robert Meier's Master Thesis, *Mobile Computer Network Architecture* (May 1993).

*Digital European Cordless Telecommunications Reference Document* (Mar. 1991).

Haine, *A New Radio Access Protocol and Network Architecture for Mobile Packet Data*, 41st IEEE Ventricular Technology Conference.

Owen, *The DECT Radio Interface*, Colloquium on CT2/CA1 and DECT Cordless Telecommunications (1990).

Tuttlebee, *Cordless Telecommunications in Europe* (1990).

\* cited by examiner

*Primary Examiner*—Tammara Peyton
(74) *Attorney, Agent, or Firm*—McAndrews, Held & Malloy, Ltd.

(57) ABSTRACT

An apparatus and a method for routing data in a radio data communication system having one or more host computers, one or more intermediate base stations, and one or more RF terminals organizes the intermediate base stations into an optimal spanning-tree network to control the routing of data to and from the RF terminals and the host computer efficiently and dynamically. Communication between the host computer and the RF terminals is achieved by using the network of intermediate base stations to transmit the data.

33 Claims, 2 Drawing Sheets

COMMUNICATION NETWORK HAVING A PLURALITY OF BRIDGING NODES WHICH TRANSMITS A POLLING MESSAGE WITH BACKWARD LEARNING TECHNIQUE TO DETERMINE COMMUNICATION PATHWAY

CROSS-REFERENCE TO RELATED APPLICATIONS

The present application is a continuation of application Ser. No. 10/123,873 filed Apr. 16, 2002, now U.S. Pat. No. 6,895,450 which is a continuation of application Ser. No. 09/060,287, filed Apr. 14, 1998, now U.S. Pat. No. 6,374,311, which is a continuation of application Ser. No. 08/395,555, filed Feb. 28, 1995, now U.S. Pat. No. 5,740,366, which is a continuation of application Ser. No. 08/255,848, filed Jun. 8, 1994, now U.S. Pat. No. 5,394,436, which is a continuation of application Ser. No. 07/970,411 filed Nov. 2, 1992, now abandoned, which is a continuation-in-part of application Ser. No. 07/968,990, filed Oct. 30, 1992, now abandoned, which is a continuation-in-part of application Ser. No. 07/769,425, filed Oct. 1, 1992, now abandoned. Application Ser. No. 07/968,990 is also a continuation-in-part of PCT International Application No. PCT/US92/08610, filed Oct. 1, 1992 and published as WO 93/07691 on Apr. 15, 1993 which is a continuation-in-part of application Ser. No. 07/769,425 filed date Oct. 1, 1991. This application is a continuation-in-part of Ser. No. 09/060,287 filed Apr. 14, 1998, now U.S. Pat. No. 6,374,311 is also a continuation-in-part of U.S. application Ser. No. 08/545,108, filed Oct. 19, 1995, now U.S. Pat. No. 5,940,771, which is a continuation of: 1) U.S. application Ser. No. 07/947,102, filed Sep. 14, 1992, now abandoned; and 2) U.S. application Ser. No. 07/907,927, filed Jun. 30, 1992, now abandoned. Application Ser. No. 07/947,102 is also a continuation-in-part of application Ser. No. 07/907,927. Application Ser. No. 07/907,927 is a continuation-in-part of: 1) U.S. application Ser. No. 07/857,603, filed Mar. 30, 1992, now abandoned, which is a continuation-in-part of U.S. application Ser. No. 07/700,704, filed May 14, 1991, now abandoned, which is itself a continuation-in-part of U.S. application Ser. No. 07/699,818, filed May 13, 1991, now abandoned; 2) PCT Application No. US92/03982, filed May 13, 1992, now abandoned; 3) U.S. application Ser. No. 07/769,425, filed Oct. 1, 1991, now abandoned; and 4) U.S. application Ser. No. 07/802,348, filed Dec. 4, 1991, now abandoned, which is a continuation-in-part of U.S. application Ser. No. 07/790,946, filed Nov. 12, 1991, now abandoned. This application is also related to application Ser. No. 10/965,991 filed Oct. 15, 2004.

Appendix B is a microfiche appendix containing a list of the program modules (also included as Appendix A) and the program modules themselves which comprise an exemplary computer program listing of the source code used by the network controllers and intelligent base transceivers of the present invention. The microfiche appendix has ten (10) total microfiche sheets and six hundred two (602) total frames, and was originally filed in U.S. application Ser. No. 07/970,411 on Nov. 2, 1992, and is hereby incorporated herein in its entirety by reference to said U.S. application Ser. No. 07/970,411.

STATEMENT REGARDING FEDERALLY SPONSORED RESEARCH OR DEVELOPMENT

N/A

BACKGROUND OF THE INVENTION

In a typical radio data communication system having one or more host computers and multiple RF terminals, communication between a host computer and an RF terminal is provided by one or more base stations. Depending upon the application and the operating conditions, a large number of these base stations may be required to adequately serve the system. For example, a radio data communication system installed in a large factory may require dozens of base stations in order to cover the entire factory floor.

In earlier RF (Radio Frequency) data communication systems, the base stations were typically connected directly to a host computer through multi-dropped connections to an Ethernet communication line. To communicate between an RF terminal and a host computer, in such a system, the RF terminal sends data to a base station and the base station passes the data directly to the host computer. Communicating with a host computer through a base station in this manner is commonly known as hopping. These earlier RF data communication systems used a single-hop method of communication.

In order to cover a larger area with an RF data communication system and to take advantage of the deregulation of the spread-spectrum radio frequencies, later-developed RF data communication systems are organized into layers of base stations. As in earlier RF data communications systems, a typical system includes multiple base stations which communicate directly with the RF terminals and the host computer. In addition, the system also includes intermediate stations that communicate with the RF terminals, the multiple base stations, and other intermediate stations. In such a system, communication from an RF terminal to a host computer may be achieved, for example, by having the RF terminal send data to an intermediate station, the intermediate station send the data to a base station, and the base station send the data directly to the host computer. Communicating with a host computer through more than one station is commonly known as a multiple-hop communication system.

Difficulties often arise in maintaining the integrity of such multiple-hop RF data communication systems. The system must be able to handle both wireless and hard-wired station connections, efficient dynamic routing of data information, RF terminal mobility, and interference from many different sources.

SUMMARY OF THE INVENTION

The present invention solves many of the problems inherent in a multiple-hop data communication system. The present invention comprises an RF Local-Area Network capable of efficient and dynamic handling of data by routing communications between the RF Terminals and the host computer through a network of intermediate base stations.

In one embodiment of the present invention, the RF data communication system contains one or more host computers and multiple gateways, bridges, and RF terminals. Gateways are used to pass messages to and from a host computer and the RF Network. A host port is used to provide a link between the gateway and the host computer. In addition, gateways may include bridging functions and may pass information from one RF terminal to another. Bridges are intermediate relay nodes which repeat data messages. Bridges can repeat data to and from bridges, gateways and RF terminals and are used to extend the range of the gateways.

The RF terminals are attached logically to the host computer and use a network formed by a gateway and the bridges to communicate with the host computer. To set up the network, an optimal configuration for conducting network communication spanning tree is created to control the flow of data communication. To aid understanding by providing a more visual description, this configuration is referred to hereafter as a "spanning tree" or "optimal spanning tree".

Specifically, root of the spanning tree are the gateways; the branches are the bridges; and non-bridging stations, such as RF terminals, are the leaves of the tree. Data are sent along the branches of the newly created optimal spanning tree. Nodes in the network use a backward learning technique to route packets along the correct branches.

One object of the present invention is to route data efficiently, dynamically, and without looping. Another object of the present invention is to make the routing of the data transparent to the RF terminals. The RF terminals, transmitting data intended for the host computer, are unaffected by the means ultimately used by the RF Network to deliver their data.

It is a further object of the present invention for the network to be capable of handling RF terminal mobility and lost nodes with minimal impact on the entire RF data communication system.

DETAILED DESCRIPTION OF THE INVENTION

Figure 1:
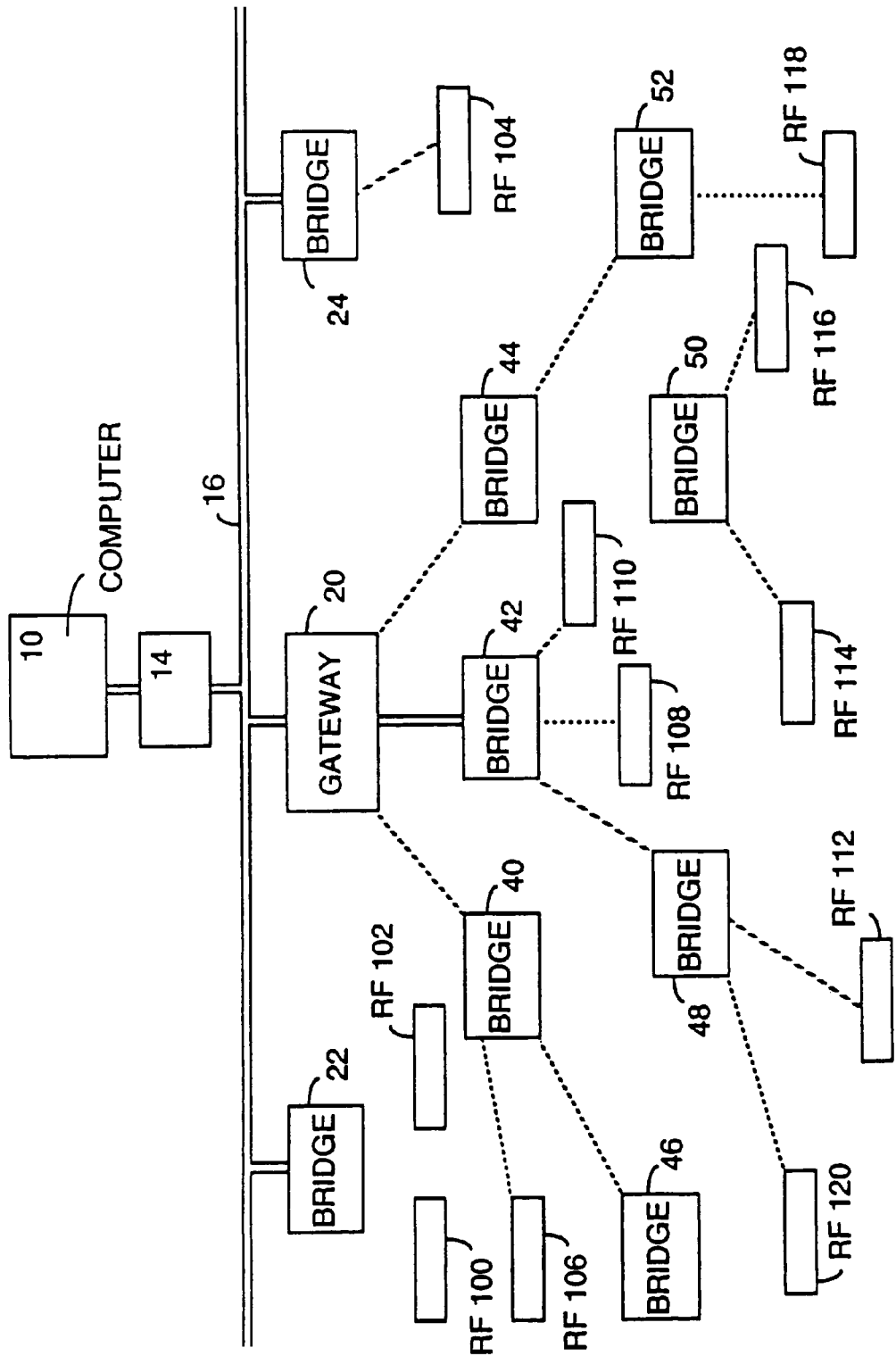
FIG. 1 is a functional block diagram of an RF data communication system incorporating the RF local-area network of the present invention.

FIG. 1 is a functional block diagram of an RF data communication system. In one embodiment of the present invention, the RF data communication system has a host computer 10, a network controller 14 and bridges 22 and 24 attached to a data communication link 16. Also attached to the data communication link 16 is a gateway 20 which acts as the root node for the spanning tree of the RF data network of the present invention. A bridge 42 is attached to the gateway 20 through a hard-wired communication link and bridges 40 and 44 are logically attached to gateway 20 by two independent RF links. Additional bridges 46, 48, 50 and 52 are also connected to the RF Network and are shown in the FIG. 1. Note that, although shown separate from the host computer 10, the gateway 20 (the spanning tree root node) may be part of host computer 10.

The FIG. 1 further shows RF terminals 100 and 102 attached to bridge 22 via RF links and RF terminal 104 attached to bridge 24 via an RF link. Also, RF terminals 106, 108, 110, 112, 114, 116, 118, and 120 can be seen logically attached to the RF Network through their respective RF links. The RF terminals in FIG. 1 are representative of non-bridging stations. In alternate embodiments of the present invention, the RF Network could contain any type of device capable of supporting the functions needed to communicate in the RF Network such as hard-wired terminals, remote printers, stationary bar code scanners, or the like. The RF data communication system, as shown in FIG. 1, represents the configuration of the system at a discrete moment in time after the initialization of the system. The RF links, as shown, are dynamic and subject to change. For example, changes in the structure of the RF data communication system can be caused by movement of the RF terminals and by interference that affects the RF communication links.

In the preferred embodiment, the host computer 10 is an IBM 3090, the network controller 14 is a model RC3250 of the Norand Corporation, the data communication link 16 is an Ethernet link, the nodes 20, 22, 24, 40, 42, 44, 46, 48, 50 and 52 are intelligent base transceiver units of the type RB4000 of the Norand Corporation, and the RF terminals 100, 102, 104, 106, 108, 110, 112, 114, 116, 118 and 120 are of type RT1100 of the Norand Corporation.

The optimal spanning tree, which provides the data pathways throughout the communication system, is stored and maintained by the network as a whole. Each node in the network stores and modifies information which specifies how local communication traffic should flow. Optimal spanning trees assure efficient, adaptive (dynamic) routing of information without looping.

To initialize the RF data communication system, the gateway 20 and the other nodes are organized into an optimal spanning tree rooted at the gateway 20. To form the optimal spanning tree, in the preferred embodiment the gateway 20 is assigned a status of ATTACHED and all other bridges are assigned the status UNATTACHED. The gateway 20 is considered attached to the spanning tree because it is the root node. Initially, all other bridges are unattached and lack a parent in the spanning tree. At this point, the attached gateway node 20 periodically broadcasts a specific type of polling packet referred to hereafter as "HELLO packets". The HELLO packets can be broadcast using known methods of communicating via radio frequency (RF) link or via a direct wire link. In the preferred embodiment of the present invention, the RF link is comprised of spread-spectrum transmissions using a polling protocol. Although a polling protocol is preferred, a carrier-sense multiple-access (CSMA), busy-tone, or any other protocol might also manage the communication traffic on the RF link.

HELLO packets contain 1) the address of the sender, 2) the hopping distance that the sender is from the root, 3) a source address, 4) a count of nodes in the subtree which flow through that bridge, and 5) a list of system parameters. Each node in the network is assigned a unique network service address and a node-type identifier to distinguish between different nodes and different node types. The distance of a node from the root node is measured in hops times the bandwidth of each hop. The gateway root is considered to be zero hops away from itself.

Figure 2:
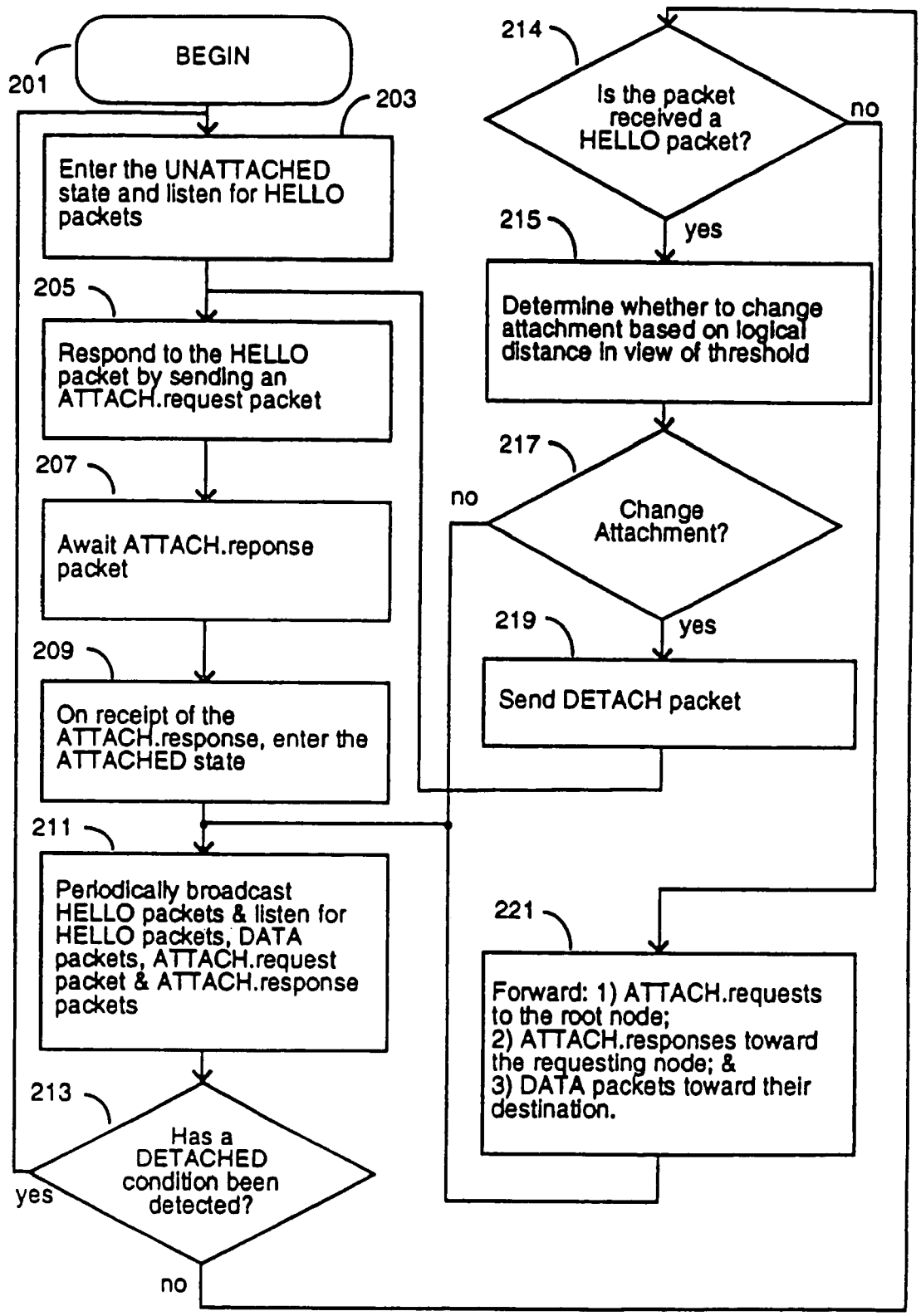
FIG. 2 is a flow diagram illustrating a bridging node's construction and maintenance of the spanning tree.

FIG. 2 is a flow diagram illustrating a bridge's participation in the construction and maintenance of the spanning tree. At a block 201, the bridge begins the local construction of the spanning tree upon power-up. Next, at a block 203, the bridge enters the UNATTACHED state, listening for HELLO packets (also referred to as HELLO messages herein) that are broadcast.

By listening to the HELLO messages, bridges can learn which nodes are attached to the spanning tree. At a block 205, the bridge responds to a HELLO packet received by sending an ATTACH.request packet to the device that sent the received HELLO packet. The ATTACH.request packet is thereafter forwarded towards and to the root node which responds by sending an ATTACH.response packet back down towards and to the bridge.

The bridge awaits the ATTACH.response packet at a block 207. Upon receipt of the ATTACH.response packet, at a block 209, the bridge enters an ATTACHED state. Thereafter, at a block 211, the bridge begins periodically broadcasting HELLO packets and begins forwarding or relaying packets received. Specifically, between HELLO packet broadcasts, the bridge listens for HELLO, DATA, ATTACH.request and ATTACH.response packets broadcast by other devices in the communication network. Upon receiving such a packet, the bridge branches to a block 213. At the block 213, if the bridge detects that it has become detached from the spanning tree the bridge will branch back to the block 203 to establish attachment. Note that although the illustration in FIG. 2 places block 213 immediately after the block 211, the bridges functionality illustrated in block 213 is actually distributed throughout the flow diagram.

If at the block 213 detachment has not occurred, at a block 214, the bridge determines if the received packet is a HELLO packet. If so, the bridge analyzes the contents of the HELLO packet at a block 215 to determine whether to change its attachment point in the spanning tree. In a preferred embodiment, the bridge attempts to maintain attachment to the spanning tree at the node that is logically closest to the root node.

The logical distance, in a preferred embodiment, is based upon the number of hops needed to reach the root node and the bandwidth of those hops. The distance the attached node is away from the root node is found in the second field of the HELLO message that is broadcast. In another embodiment of the present invention, the bridges consider the number of nodes attached to the attached node as well as the logical distance of the attached node from the root node. If an attached node is overloaded with other attached nodes, the unattached bridge may request attachment to the less loaded node, or to a more loaded node as described above in networks having regions of substantial RF overlap. In yet another embodiment, to avoid instability in the spanning tree, the bridge would only conclude to change attachment if the logical distance of the potential replacement is greater than a threshold value.

If no change in attachment is concluded, at a block 217 the bridge branches back to the block 211. If a determination is made to change attachment, a DETACH packet is sent to the root as illustrated at a block 219. After sending the DETACH packet, the bridge branches back to the block 205 to attach to the new spanning tree node. Note that the order of shown for detachment and attachment is only illustrative and can be reversed.

Referring back to the block 214, if the received packet (at block 211) is not a HELLO packet, the bridge branches to a block 221 to forward the received packet through the spanning tree. Afterwards, the bridge branches back to the block 211 to continue the process.

Specifically, once attached, the attached bridge begins broadcasting HELLO packets (at the block 211) seeking to have all unattached bridges (or other network devices) attach to the attached bridge. Upon receiving an ATTACH.request packet, the bridge forwards that packet toward the root node (through the blocks 211, 213, 214 and 221. On its path toward the root, each node records the necessary information of how to reach requesting bridge. This process is called "backward learning" herein, and is discussed more fully below. As a result of the backward learning, once the root node receives the ATTACH.request packet, an ATTACH.response packet can be sent through the spanning tree to the bridge requesting attachment.

After attaching to an attached node, the newly attached bridge (the child) must determine its distance from the root node. To arrive at the distance of the child from the root node, the child adds the broadcast distance of its parent from the root node to the distance of the child from its parent. In the preferred embodiment, the distance of a child from its parent is based on the bandwidth of the data communication link. For example, if the child attaches to its parent via a hard-wired link (data rate 26,000 baud), then the distance of that communication link might equal, for example, one hop. However, if the child attaches to its parent via an RF link (data rate 9600 baud), then the distance of that communication link might correspondingly be equal 3 hops. The number of the hop corresponds directly to the communication speed of the link. This may not only take into consideration baud rate, but also such factors as channel interference.

Initially, only the root gateway node 20 is broadcasting HELLO messages and only nodes 40, 42 and 44 are within range of the HELLO messages broadcast by the gateway. Therefore, after the listening period has expired, nodes 40, 42 and 44 request attachment to the gateway node 20. The unattached nodes 40, 42, and 44 send ATTACH.request packets and the attached gateway node 20 acknowledges the ATTACH.request packets with local ATTACH.confirm packets. The newly attached bridges are assigned the status ATTACHED and begin broadcasting their own HELLO packets, looking for other unattached bridges. Again, the remaining unattached nodes attempt to attach to the attached nodes that are logically closest to the root node. For example, node 48 is within range of HELLO messages from both nodes 40 and 42. However, node 40 is three hops, via an RF link, away from the gateway root node 20 and node 42 is only one hop, via a hard-wired link, away from the gateway root node 20. Therefore, node 48 attaches to node 42, the closest node to the gateway root node 20.

The sending of HELLO messages, ATTACH.request packets and ATTACH.confirm packets continues until the entire spanning tree is established. In addition, attached bridges may also respond to HELLO messages. If a HELLO message indicates that a much closer route to the root node is available, the attached bridge sends a DETACH packet to its old parent and an ATTACH.request packet to the closer node. To avoid instability in the system and to avoid overloading any given node, an attached bridge would only respond to a HELLO message if the hop count in a HELLO packet is greater than a certain threshold value, CHANGE_THRESHOLD. In the preferred embodiment, the value of the CHANGE_THRESHOLD equals 3. In this manner, an optimal spanning tree is formed that is capable of transmitting data without looping.

Nodes, other than the gateway root node, after acknowledging an ATTACH.request packet from a previously unattached node, will send the ATTACH.request packet up the branches of the spanning tree to the gateway root node. As the ATTACH.request packet is being sent to the gateway root node, other nodes attached on the same branch record the destination of the newly attached node in their routing entry table. When the ATTACH.request packet reaches the gateway root node, the gateway root node returns an end-to-end ATTACH.confirm packet.

After the spanning tree is initialized, the RF terminals listen for periodically broadcasted Hello packets to determine which attached nodes are in range. After receiving HELLO messages from attached nodes, an RF terminal responding to an appropriate poll sends an ATTACH.request packet to attach to the node logically closest to the root. For example, RF terminal 110 is physically closer to node 44. However, node 44 is three hops, via an RF link, away from the gateway root node 20 and node 42 is only one hop, via a hard-wired link, away from the gateway root node 20. Therefore, RF terminal 110, after hearing HELLO messages from both nodes 42 and 44, attaches to node 42, the closest node to the gateway root node 20. Similarly, RF terminal 114 hears HELLO messages from nodes 48 and 50. Nodes 48 and 50 are both four hops away from the gateway root node 20. However, node 48 has two RF terminals 110 and 112 already attached to it while node 50 has only one RF terminal 116 attached to it. Therefore, RF terminal 114 will attach to node 50, the least busy node of equal distance to the gateway root node 20. Attaching to the least busy node proves to be the most efficient practice when the communication system has little overlap in the RF communication regions. In another embodiment, however, instead of attaching to the least busy node of equal distance to the gateway root node 20, the attachment is established with the busiest node.

The attached node acknowledges the ATTACH.request and sends the ATTACH.request packet to the gateway root node. Then, the gateway root node returns an end-to-end ATTACH-.confirm packet. In this manner, the end-to-end ATTACH.request functions as a discovery packet enabling the gateway root node, and all other nodes along the same branch, to learn the address of the RF terminal quickly. This process is called backward learning. Nodes learn the addresses of terminals by monitoring the traffic from terminals to the root. If a packet arrives from a terminal that is not contained in the routing table of the node, an entry is made in the routing table. The entry includes the terminal address and the address of the node that sent the packet. In addition, an entry timer is set for that terminal. The entry timer is used to determine when RF terminals are actively using the attached node. Nodes maintain entries only for terminals that are actively using the node for communication. If the entry timer expires due to lack of communication, the RF terminal entry is purged from the routing table.

The RF links among the RF terminals, the bridges, and the gateway are often lost. Therefore, a connection-oriented data-link service is used to maintain the logical node-to-node links. In the absence of network traffic, periodic messages are sent and received to ensure the stability of the RF link. As a result, the loss of a link is quickly detected and the RF Network can attempt to establish a new RF link before data transmission from the host computer to an RF terminal is adversely affected.

Communication between terminals and the host computer is accomplished by using the resulting RF Network. To communicate with the host computer, an RF terminal sends a data packet in response to a poll from the bridge closest to the host computer. Typically, the RF terminal is attached to the bridge closest to the host computer. However, RF terminals are constantly listening for HELLO and polling messages from other bridges and may attach to, and then communicate with, a bridge in the table of bridges that is closer to the particular RF terminal.

Under certain operating conditions, duplicate data packets can be transmitted in the RF Network. For example, it is possible for an RF terminal to transmit a data packet to its attached node, for the node to transmit the acknowledgement frame, and for the RF terminal not to receive the acknowledgement. Under such circumstances, the RF terminal will retransmit the data. If the duplicate data packet is updated into the database of the host computer, the database would become corrupt. Therefore, the RF Network of the present invention detects duplicate data packets. To ensure data integrity, each set of data transmissions receives a sequence number. The sequence numbers are continuously incremented, and duplicate sequence numbers are not accepted.

When a bridge receives a data packet from a terminal directed to the host computer, the bridge forwards the data packet to the parent node on the branch. The parent node then forwards the data packet to its parent node. The forwarding of the data packet continues until the gateway root node receives the data packet and sends it to the host computer. Similarly, when a packet arrives at a node from the host computer directed to an RF terminal, the node checks its routing entry table and forwards the data packet to its child node which is along the branch destined for the RF terminal. It is not necessary for the nodes along the branch containing the RF terminal to know the ultimate location of the RF terminal. The forwarding of the data packet continues until the data packet reaches the final node on the branch, which then forwards the data packet directly to the terminal itself.

Communication is also possible between RF terminals. To communicate with another RF terminal, the RF terminal sends a data packet to its attached bridge. When the bridge receives the data packet from a terminal directed to the host computer, the bridge checks to see if the destination address of the RF terminal is located within its routing table. If it is, the bridge simply sends the message to the intended RF terminal. If not, the bridge forwards the data packet to its parent node. The forwarding of the data packet up the branch continues until a common parent between the RF terminals is found. Then, the common parent (often the gateway node itself) sends the data packet to the intended RF terminal via the branches of the RF Network.

During the normal operation of the RF Network, RF terminals can become lost or unattached to their attached node. If an RF terminal becomes unattached, for whatever reason, its routing entry is purged and the RF terminal listens for HELLO or polling messages from any attached nodes in range. After receiving HELLO or polling messages from attached nodes, the RF terminal sends an ATTACH.request packet to the attached node closest to the root. That attached node acknowledges the ATTACH.request and sends the ATTACH.request packet onto the gateway root node. Then, the gateway root nods returns an end-to-end ATTACH.confirm packet.

Bridges can also become lost or unattached during normal operations of the RF Network. If a bridge becomes lost or unattached, all routing entries containing the bridge are purged. The bridge then broadcasts a HELLO.request with a global bridge destination address. Attached nodes will broadcast HELLO packets immediately if they receive an ATTACH.request packet with a global destination address. This helps the lost node re-attach. Then, the bridge enters the LISTEN state to learn which attached nodes are within range. The unattached bridge analyzes the contents of broadcast HELLO messages to determine whether to request attachment to the broadcasting node. Again, the bridge attempts to attach to the node that is logically closest to the root node. After attaching to the closest node, the bridge begins broadcasting HELLO messages to solicit ATTACH.requests from other nodes or RF terminals.

The spread-spectrum system provides a hierarchical radio frequency network of on-line terminals for data entry and message transfer in a mobile environment. The network is characterized by sporadic data traffic over multiple-hop data paths consisting of RS485 or ethernet wired links and single-channel direct sequenced spread spectrum links. The network architecture is complicated by moving, hidden, and sleeping nodes. The spread spectrum system consists of the following types of devices:

Terminal controller—A gateway which passes messages from a host port to the RF network; and which passes messages from the network to the host port. The host port (directly or indirectly) provides a link between the controller and a "host" computer to which the terminals are logically attached.

Base station—An intermediate relay node which is used to extend the range of the controller node. Base station-to-controller or base station-to-base station links can be wired or wireless RF.

Terminal—Norand RF hand-held terminals, printers, etc. In addition, a controller device has a terminal component.

The devices are logically organized as nodes in an (optimal) spanning tree, with the controller at the root, internal nodes in base stations or controllers on branches of the tree, and terminal nodes as (possibly mobile) leaves on the tree.

Like a sink tree, nodes closer to the root of the spanning tree are said to be "downstream" from nodes which are further away. Conversely, all nodes are "upstream" from the root. Packets are only sent along branches of the spanning tree. Nodes in the network use a "BACKWARD LEARNING" technique to route packets along the branches of the spanning tree.

Devices in the spanning tree are logically categorized as one of the following three node types:

1) Root (or root bridge)—A controller device which functions as the root bridge of the network spanning tree. In the preferred embodiment, the spanning tree has a single root node. Initially, all controllers are root candidates from which a root node is selected. This selection may be based on the hopping distance to the host, preset priority, random selection, etc.

2) Bridge—An internal node in the spanning tree which is used to "bridge" terminal nodes together into an interconnected network. The root node is also considered a bridge and the term "bridge" may be used to refer to all non-terminal nodes or all non-terminal nodes except the root, depending on the context herein. A bridge node consists of a network interface function and a routing function.

3) Terminal—leaf node in the spanning tree. A terminal node can be viewed as the software entity that terminates a branch in the spanning tree.

A controller device contains a terminal node(s) and a bridge node. The bridge node is the root node if the controller is functioning as the root bridge. A base station contains a bridge node. A terminal device contains a terminal node and must have a network interface function. A "bridging entity" refers to a bridge node or to the network interface function in a terminal.

The basic requirements of the system are the following.
a) Wired or wireless node connections.
b) Network layer transparency.
c) Dynamic/automatic network routing configuration.
d) Terminal mobility. Terminals should be able to move about the RF network without losing an end-to-end connection.
e) Ability to accommodate sleeping terminals.
f) Ability to locate terminals quickly.
g) Built-in redundancy. Lost nodes should have minimal impact on the network.
h) Physical link independence. The bridging algorithm is consistent across heterogeneous physical links.

The software for the spread-spectrum system is functionally layered as follows.

Medium Access Control (MAC)

The MAC layer is responsible for providing reliable transmission between any two nodes in the network (i.e. terminal-to-bridge). The MAC has a channel access control component and a link control component. The link control component facilitates and regulates point-to-point frame transfers in the absence of collision detection. The MAC channel access control component regulates access to the network. Note that herein, the MAC layer is also referred to as the Data Link layer.

Bridging Layer

The bridging layer, which is also referred to herein as the network layer, has several functions as follows.

1. The bridging layer uses a "HELLO protocol" to organize nodes in the network into an optimal spanning tree rooted at the root bridge. The spanning tree is used to prevent loops in the topology. Interior branches of the spanning tree are relatively stable (i.e. controller and relay stations do not move often). Terminals, which are leaves on the spanning three, may become unattached, and must be reattached, frequently.

2. The bridging layer routes packets from terminals to the host, from the host to terminals, and from terminals to terminals along branches of the spanning tree.

3. The bridging layer provides a service for storing packets for SLEEPING terminals. Packets which cannot be delivered immediately can be saved by the bridging entity in a parent node for one or more HELLO times.

4. The bridging layer propagates lost node information throughout the spanning tree.

5. The bridging layer maintains the spanning tree links.

6. The bridging layer distributes network interface addresses.

Logical Link Control Layer

A logical link control layer, also known herein as the Transport layer herein, is responsible for providing reliable transmission between any two nodes in the network (i.e., terminal-to-base station). The data-link layer provides a connection-oriented reliable service and a connectionless unreliable service. The reliable service detects and discards duplicate packets and retransmits lost packets. The unreliable services provides a datagram facility for upper layer protocols which provide a reliable end-to-end data path. The data-link layer provides ISO layer 2 services for terminal-to-host application sessions which run on top of an end-to-end terminal-to-host transport protocol. However, the data-link layer provides transport (ISO layer 4) services for sessions contained within the SST network.

Higher Layers

For terminal-to-terminal sessions contained within the SST network, the data-link layer provides transport layer services and no additional network or transport layer is required. In this case, the MAC, bridging, and data-link layers discussed above can be viewed as a data-link layer, a network layer, and a transport layer, respectively. For terminal-to-host-application sessions, higher ISO layers exist on top of the SST data-link layer and must be implemented in the terminal and host computer, as required. This document does not define (or restrict) those layers. This document does discuss a fast-connect VMTP-like transport protocol which is used for transient internal terminal-to-terminal sessions.

Specifically, a network layer has several functions, as follows.

1) The network layer uses a "hello protocol" to organize nodes in the network into an optimal spanning tree rooted at the controller. (A spanning tree is required to prevent loops in the topology.) Interior branches of the spanning tree are relatively stable (i.e., the controller and base stations do not move often). Terminals, which are leaves on the spanning tree, become unattached, and must be reattached frequently.

2) The network layer routes messages from terminals to the host, from the host to terminals, and from terminals to terminals along branches of the spanning tree.

3) The network layer provides a service for storing messages for SLEEPING terminals. Messages which cannot be delivered immediately can be saved by the network entity in a parent node for one or more hello times.

4) The network layer propagates lost node information throughout the spanning tree.

5) The network layer maintains the spanning tree links in the absence of regular data traffic.

A transport layer is responsible for establishing and maintaining a reliable end-to-end data path between transport access points in any two nodes in the network. The transport layer provides unreliable, reliable and a transaction-oriented services. The transport layer should be immune to implementation changes in the network layer.

The responsibilities of the transport layer include the following.

1) Establishing and maintaining TCP-like connections for reliable root-to-terminal data transmission.

2) Maintaining VMTP-like transaction records for reliable transient message passing between any two nodes.

3) Detecting and discarding duplicate packets.

4) Retransmitting lost packets.

Layers 1 through 4 are self-contained within the Norand RF network, and are independent of the host computer and of terminal applications. The session layer (and any higher layers) are dependent on specific applications. Therefore, the session protocol (and higher protocols) must be implemented as required. Note that a single transport access point is sufficient to handle single sessions with multiple nodes. Multiple concurrent sessions between any two nodes could be handled with a session identifier in a session header.

Network address requirements are as follows. DLC framed contain a hop destination and source address in the DLC header. network packets contain an end-to-end destination and a source address in the network header. Transport messages do not contain an address field; instead, a transport connection is defined by network layer source and destination address pairs. Multiple transport connections require multiple network address pairs.

The transport header contains a TRANSPORT ACCESS POINT identifier. DLC and network addresses are consistent and have the same format. Each node has a unique LONG ADDRESS which is programmed into the node at the factory. The long address is used only to obtain a SHORT ADDRESS from the root node.

The network entity in each node obtains a SHORT ADDRESS from the root node, which identifies the node uniquely. The network entity passes the short address to the DLC entity. Short addresses are used to minimize packet sizes.

Short addresses consist of the following. There is: an address length bit (short or long).

a spanning tree identified.

a node-type identifier. Node types are well known.

a unique multi-cast or broadcast node identifier.

The node-identifier parts of root addresses are well known and are constant. A default spanning tree identifier is well known by all nodes. A non-default spanning tree identifier can be entered into the root node (i.e., by a network administrator) and advertised to all other nodes in "hello" packets. The list of non-default spanning trees to which other nodes can attach must be entered into each node.

A node-type identifier of all 1's is used to specify all node types. A node identifier of all 1's is used to specify all nodes of the specified type. A DLC identifier of all 0's is used to specify a DLC entity which does not yet have an address. The all-0's address is used in DLC frames that are used to send and receive network ADDRESS packets. (The network entity in each node filters ADDRESS packets based on the network address.)

Short-address allocation is accomplished as follows. Short node identifiers of root nodes are well known. All other nodes must obtain a short node identifier from the root. To obtain a short address, a node send an ADDRESS request packet to the root node. The source addresses (i.e., DLC and network) in the request packet are LONG ADDRESSES. The root maintains an address queue of used and unused SHORT ADDRESSES. If possible, the root selects an available short address, associates the short address with the long address of the requesting node, and returns the short address to the requesting node in an ADDRESS acknowledge packet. (Note that the destination address in the acknowledge packet is a long address.)

A node must obtain a (new) short address initially and whenever an ADDRESS-TIMEOUT inactivity period expires without having the node receive a packet from the network entity in the root.

The network entity in the root maintains addresses in the address queue in least recently used order. Whenever a packet is received, the source address is moved to the end of the queue. The address at the head of the queue is available for use by a requesting node if it has never been used or if it has been inactive for a MAX-ADDRESS-LIFE time period.

MAX-ADDRESS-LIFE must be larger than ADDRESS-TIMEOUT to ensure that an address is not in use by any node when it becomes available for another node. If the root receives an ADDRESS request from a source for which an entry exists in the address queue, the root simply updates the queue and returns the old address.

The network layer organizes nodes into an optimal spanning tree with the controller at the root of the tree. (Note that the spanning three identifier allows two logical trees to exist in the same coverage area.) Spanning tree organization is facilitated with a HELLO protocol which allows nodes to determine the shortest path to the root before attaching to the spanning tree. All messages are routed along branches of the spanning tree.

Nodes in the network are generally categorized as ATTACHED or UNATTACHED. Initially, only the root node is attached. A single controller may be designated as the root, or multiple root candidates (i.e. controllers) may negotiate to determine which node is the root. Attached bridge nodes and root candidates transmit "HELLO" packets at calculated intervals. The HELLO packets include:

a) the source address, which includes the spanning tree ID).

b) a broadcast destination address.

c) a "seed" value from which the time schedule of future hello messages can be calculated.

d) a hello slot displacement time specifying an actual variation that will occur in the scheduled arrival of the very next hello message (the scheduled arrival being calculated from the "seed").

e) the distance (i.e., path cost) of the transmitter from the host. The incremental portion of the distance between a node and its parent is primarily a function of the type of physical link (i.e. ethernet, RS485, RF, or the like). If a signal-strength indicator is available, connections are biased toward the link with the best signal strength. The distance component is intended to bias path selection toward (i.e., wired) high-speed connections. Setting a minimum signal strength threshold helps prevent sporadic changes in the network. In addition, connections can be biased to balance the load (i.e., the number of children) on a parent node.

f) a pending message list. Pending message lists consist of 0 or more destination-address/message-length pairs. Pending messages for terminals are stored in the terminal's parent node.

g) a detached-node list. Detached-node lists contain the addresses of nodes which have detached from the spanning tree. The root maintains two lists. A private list consists of all detached node addresses, and an advertised list consists of the addresses of all detached nodes which have pending transport messages. The addresses in the hello packet are equivalent to the advertised list.

An internal node learns which entries should be in its list from hello messages transmitted by its parent node. The root node builds its detached-node lists from information received in DETACH packets. Entries are included in hello messages for DETACH-MSG-LIFE hello times.

Attached notes broadcast "SHORT HELLO" messages immediately if they receive an "HELLO.request" packet with a global destination address; otherwise, attached nodes will only broadcast hello messages at calculated time intervals in "hello slots." Short hello messages do not contain a pending-message or detached-node list. Short hello messages are sent independently of regular hello messages and do not affect regular hello timing.

Unattached nodes (nodes without a parent in the spanning tree) are, initially, in an "UNATTACHED LISTEN" state. During the listen state, a node learns which attached base station/controller is closest to the root node by listening to hello messages. After the listening period expires an unattached node sends an ATTACH.request packet to the attached node closest to the root. The attached node immediately acknowledges the ATTACH.request, and send the ATTACH-.request packet onto the root (controller) node. The root node returns the request as an end-to-end ATTACH.confirm packet. If the newly-attached node is a base station, the node calculates its link distance and adds the distance to the distance of its parent before beginning to transmit hello messages.

The end-to-end ATTACH.request functions as a discovery packet, and enables the root node to learn the address of the source node quickly. The end-to-end ATTACH. request, when sent from a node to the root, does not always travel the entire distance. When a downstream node receives an ATTACH.request packet and already has a correct routing entry for the associated node, the downstream node intercepts the request and returns the ATTACH.confirm to the source node. (Note that any data piggy-backed on the ATTACH.request packet must still be forwarded to the host.) This situation occurs whenever a "new" path has more than one node in common with the "old" path.

The LISTEN state ends after MIN_HELLO hello time slots if hello messages have been received from at least one node. If no hello messages have been received the listening node waits and retries later.

An attached node may respond to a hello message from a node other than its parent (i.e., with an ATTACH.request) if the difference in the hop count specified in the hello packet exceeds a CHANGE-THRESHOLD level.

Unattached nodes may broadcast a GLOBAL ATTACH-.request with a multi-cast base station destination address to solicit short hello messages from attached base stations. The net effect is that the LISTEN state may (optionally) be shortened. (Note that only attached base station or the controller may respond to ATTACH. requests.) Normally, this facility is reserved for base stations with children and terminals with transactions in progress.

ATTACH. requests contain a (possibly empty) CHILD LIST, to enable internal nodes to update their routing tables. ATTACH.requests also contain a "count" field which indicates that a terminal may be SLEEPING. The network entity in the parent of a SLEEPING terminal con temporarily store messages for later delivery. If the count field is non-zero, the network entity in a parent node will store pending messages until 1) the message is delivered, or 2) "count" hello times have expired.

Transport layer data can be piggy-backed on an attached request packet from a terminal. (i.e., an attach request/confirm can be implemented with a bit flag in the network header of a data packet.)

Network Layer Routing

All messages are routed along branches of the spanning tree. Base stations "learn" the address of terminals by monitoring traffic from terminals (i.e., to the root). When a base station receives (i.e., an ATTACH.request) packet, destined for the root, the base station creates or updates an entry in its routing table for the terminal. The entry includes the terminal address, and the address of the base station which sent the packet (i.e., the hop address). When a base station receives an upstream packet (i.e., from the root, destined for a terminal) the packet is simply forwarded to the base station which is in the routing entry for the destination. Upstream messages (i.e., to a terminal) are discarded whenever a routing entry does not exist. Downstream messages (i.e., from a terminal to the root) are simply forwarded to the next downstream node (i.e., the parent in the branch of the spanning tree.

TERMINAL-TO-TERMINAL COMMUNICATIONS is accomplished by routing all terminal-to-terminal traffic through the nearest common ancestor. In the worst case, the root is the nearest common ancestor. A "ADDRESS SERVER" facilitates terminal-to-terminal communications (see below).

DELETING INVALID ROUTING TABLE ENTRIES is accomplished in several ways: connection oriented transport layer ensures that packets will arrive from nodes attached to the branch of the spanning tree within the timeout period, unless a node is disconnected.)

2) Whenever the DLC entity in a parent fails RETRY MAX times to send a message to a child node, the node is logically disconnected from the spanning tree, with one exception. If the child is a SLEEPING terminal, the message is retained by the network entity in the parent for "count" hello times. The parent immediately attempts to deliver the message after it sends its next hello packet. If, after "count" hello times, the message cannot be delivered, then the child is logically detached from the spanning tree. Detached node information is propagated downstream to the root node, each node in the path of the DETACH packet must adjust its routing tables appropriately according to the following rules: a) if the lost node is a child terminal-node, the routing entry for the terminal is deleted and a DETACH packet is generated, b) if the node specified in DETACH packet is a terminal and the node which delivered the packet is the next hop in the path to the terminal, then the routing table entry for the terminal is deleted and the DETACH packet is forwarded, c) if the lost node is a child base station node then all routing entries which specify that base station as the next hop are deleted and a DETACH packet is generated for each lost terminal.

IN GENERAL, WHENEVER A NODE DISCOVERS THAT A TERMINAL IS DETACHED, IT PURGES ITS ROUTING ENTRY FOR THE TERMINAL. WHENEVER A NODE DISCOVERS THAT A BASE STATION IS DETACHED, IT PURGES ALL ROUTING ENTRIES CONTAINING THE BASE STATION. ONLY ENTRIES FOR UPSTREAM NODES ARE DELETED.

When DETACH packets reach the root node, they are added to a "detached list." Nodes remain in the root node's detached list until a) the node reattaches to the spanning tree, or b) the list entry times out. The detached list is included in hello messages and is propagated throughout the spanning tree.

For example, if a terminal detaches and reattaches to a different branch in the spanning tree, all downstream nodes in the new branch (quickly) "learn" the new path to the terminal. Nodes which were also in the old path change their routing tables and no longer forward packets along the old path. At least one node, the root, must be in both the old and new path.

A new path is established as soon as an end-to-end attach request packet from the terminal reaches a node which was also in the old path.

4) A node (quickly) learns that it is detached whenever it receives a hello message, from any node, with its address in the associated detached list. The detached node can, optionally, send a global ATTACH.request, and then enters the UNATTACHED LISTEN state and reattaches as described above. After reattaching, the node must remain in a HOLD-DOWN state until its address is aged out of all detached lists. During the HOLD-DOWN state the node ignores detached lists.

5) A node becomes disconnected and enters the UNATTACHED LISTEN state whenever HELLO-RETRY-MAX hello messages are missed from its parent node.

6) A node enters the ATTACHED LISTEN state whenever a single hello message, from its parent, is missed. SLEEPING terminals remain awake during the ATTACHED LISTEN state. The state ends when the terminal receives a data or hello message from its parent. The terminal becomes UNATTACHED when a) its address appears in the detached list of a hello message from an ode other than its parent, or b) HELLO-RETRY-MAX hello messages are missed. The total number of hello slots spend in the LISTEN state is constant.

If a node in the ATTACHED LISTEN state discovers a path to the root which is CHANGE-THRESHOLD shorter, it can attach to the shorter path. Periodically, SLEEPING terminals must enter the ATTACHED LEARN state to discovery any changes (i.e., shorter paths) in the network topology.

Hello Synchronization.

All attached non-terminal nodes broadcast periodic "hello" messages in discrete "hello slots" at calculated intervals. Base station nodes learn which hello slots are busy and refrain from transmitting during busy hello slots.

A terminal refrains from transmitting during the hello slot of its parent node and refrains from transmitting during message slots reserved in a hello message.

The hello message contains a "seed" field used in a well-known randomization algorithm to determine the next hello slot for the transmitting node and the next seed. The address of the transmitting node is used as a factor in the algorithm to guarantee randomization. Nodes can execute the algorithm i times to determine the time (and seed) if the i-the hello message from the transmitter.

After attached, a base station chooses a random initial seed and a non-busy hello slot and broadcasts a hello message in that slot. The base station chooses succeeding hello slots by executing the randomization algorithm. If an execution of the algorithm chooses a busy slot, the next free slot is used and a hello "displacement" field indicates the offset from a calculated slot. Cumulative delays are not allowed (i.e., contention delays during the i hello transmission do not effect the time of the i+1 hello transmission).

HELLO-TIME and HELLO-SLOT-TIME values are set by the root node and flooded throughout the network in hello messages. The HELLO-SLOT-TIME value must be large enough to minimize hello contention.

A node initially synchronizes on a hello message from its parent. A SLEEPING node can power-down with an active timer interrupt to wake it just before the next expected hello message. The network entity in base station nodes can store messages for SLEEPING nodes and transmit them immediately following the hello messages. This implementation enables SLEEPING terminals to receive unsolicited messages. (Note that the network layer always tries to deliver messages immediately, before storing them.) Retries for pending messages are transmitted in a round-robin order when messages are pending for more than one destination.

Note that a child node that misses i hello messages, can calculate the time of the i+1 hello message.

Transport Layer Theory and Implementation Notes

The transport layer provides reliable, unreliable, and transaction-oriented services. Two types of transport connections are defined: 1) a TCP-like transport connection may be explicitly requested for long-lived connections or 2) a VMTP-like connection-record may be implicitly set up for transient connections. In addition, a connectionless service is provided for nodes which support an end-to-end transport connection with the host computer.

The interfaces to the next upper (i.e., application) layer include:

CONNECT (access_point, node_name)
LISTEN (access_point)
UNITDATA (access_point, node_name, buffer, length)
SEND (handle, buffer, length)
RECEIVE (handle, buffer, length)
CLOSE (handle)

The "handle" designates the connection type, and is the connection identifier for TCP-like connections.

SEND messages require a response from the network node (root or terminal) to which the message is directed.

UNITDATA messages do not require a response. UNITDATA is used to send messages to a host which is capable of supporting end-to-end host-to-terminal transport connections.

Because the network layer provides an unreliable service, the transport layer is required to detect duplicate packets and retransmit lost packets. Detecting duplicates is facilitated by numbering transport packets with unambiguous sequence numbers.

Transport Connections

TCP-like transport connections are used for message transmission over long-lived connections. The connections may be terminal-to-root or terminal-to-terminal (i.e., base stations are not involved in the transport connection).

TCP-like transport connections are established using a 3-way handshake. Each end selects its initial sequence number and acknowledges the other end's initial sequence number during the handshake. The node which initiates the connection must wait a MAX-PACKET-LIFE time, before requesting a connection, to guarantee that initial sequence numbers are unambiguous. Sequence numbers are incremented modulo MAX-SEQ, where MAX-SEQ is large enough to insure that duplicate sequence numbers do not exist in the network. Packet types for establishing and breaking connections are defined as in TCP.

A TCP-like connection is full-duplex and a sliding window is used to allow multiple outstanding transport packets. An ARQ bit in the transport header is used to require an immediate acknowledgment from the opposite end.

VMTP-like connections are used for transient messages (i.e. terminal-to-terminal mail messages). VMTP-like connection records are built automatically. A VMTP-like connection record is built (or updated) whenever a VMTP-like transport message is received. The advantage is that an explicit connection request is not required. The disadvantage is that longer and more carefully selected sequence numbers are required. A VMTP-like connection is half-duplex. (A full-duplex connection at a higher layer can be built with two independent half-duplex VMTP-like connections.) Acknowledgments must be handled by higher layers.

Transport connections are defined by the network end-to-end destination and source addresses.

A MAX_TP_LIFE timeout is associated with transport connections. Transport connection records are purged after a MAX_TP_LIFE time expires without activity on the connection. The transport entity in a terminal can ensure that its transport connection will not be lost by transmitting an empty time-fill transport packet whenever TP_TIMEOUT time expires without activity.

The transport entity in a node stores messages for possible retransmission. Note that retransmissions may not always follow the same path (primarily) due to moving terminals and the resulting changes in the spanning tree. For example, the network entity in a parent node may disconnect a child after the DLC entity reports a message delivery failure. The child will soon discover that it is detached and will reattach to the spanning tree. Now when the transport entity (i.e. in the root) re-sends the message, it will follow the new path.

Transport Message Timing and; Sleeping Terminals

The transport entity in a terminal calculates a separate timeout for SEND and TRANSACTION operations. Initially, both timeouts are a function of the distance of the terminal from the root node.

A TCP-like algorithm is used to estimate the expected propagation delay for each message type. Messages, which require a response, are retransmitted if twice the expected propagation time expires before a response is received. SLEEPING terminals can power down for a large percentage of the expected propagation delay before waking up to receive the response message. Note that missed messages may be stored by the network layer for "count" hello times.

Medium Access Control (MAC) Theory and Implementation Notes

Access to the network communications channel is regulated in several ways: executing the full CSMA algorithm (see MAC layer above). The sender retransmits unacknowledged messages until a RETRY_MAX count is exhausted.

The retry time of the DLC must be relatively short so that lost nodes can be detected quickly. When the DLC layer reports a failure to deliver a message to the network layer, the network layer can 1) save messages for SLEEPING terminals for later attempts, or 2) DETACH the node from the spanning tree. Note that most lost nodes are due to moving terminals.

The node identifier part of the DLC address is initially all 0's for all nodes except the root node. The all 0's address is used by a node to send and received data-link frames until a unique node identifier is passed to the DLC entity in the node. (The unique node identifier is obtained by the network entity.)

Address Resolution

Well-known names too are bound to network addresses in several ways:

The network address and TRANSPORT ACCESS ID of a name server, contained in the root, is well-known by all nodes.

A node can register a well-known name with the name server contained in the root node.

A node can request the network access address of another application from the name server by using the well-known name of the application.

Possible Extensions

Base station-to-base station traffic could also be routed through the controller if the backward learning algorithm included base station nodes. (Each base station would simply have to remember which direction on its branch of the spanning tree to send data directed toward another base station.)

The possibility of multiple controllers is kept open by including a spanning-tree identifier in address fields. Each controller defines a unique spanning tree. A node can be in more than one spanning tree, with separate network state variables defined for each.

Thus, the preferred embodiment of the present invention describes an apparatus and a method of efficiently routing data through a network of intermediate base stations in a radio data communication system.

In alternate embodiments of the present invention, the RF Networks contain multiple gateways. By including a system identifier in the address field of the nodes, it is possible to determine which nodes are connected to which networks.

Multipath Fading

In a preferred embodiment, the data to be sent through the RF communication link is segmented into a plurality of DATA packets and is then transmitted. Upon receipt, the DATA packets are reassembled for use or storage. Data segmentation of the RF link provides better communication channel efficiency by reducing the amount of data loss in the network. For example, because collisions between transmissions on an RF link cannot be completely avoided, sending the data in small segments results in an overall decrease in data loss in the network, i.e., only the small segments which collide have to be re-sent.

Similarly, choosing smaller data packets for transmission also reduces the amount of data loss by reducing the inherent effects of perturbations and fluctuations found in RF communication links. In particular, RF signals are inherently subject to what is termed "multi-path fading." A signal received by a receiver is a composite of all signals that have reached that receiver by taking all available paths from the transmitter. The received signal is therefore often referred to as a "composite signal" which has a power envelope equal to the vector sum of the individual components of the multi-path signals received. If the signals making up the composite signal are of amplitudes that add "out of phase", the desired data signal decreases in amplitude. If the signal amplitudes are approximately equal, an effective null (no detectable signal at the receiver) results. This condition is termed "fading".

Normally changes in the propagation environment occur relatively slowly, i.e., over periods of time ranging from several tenths ($\frac{1}{10}$'s) of seconds to several seconds. However, in a mobile RF environment, receivers (or the corresponding transmitters) often travel over some distance in the course of receiving a message. Because the signal energy at each receiver is determined by the paths that the signal components take to reach that receiver, the relative motion between the receiver and the transmitter causes the receiver to experience rapid fluctuations in signal energy. Such rapid fluctuations can cause fading and result in the loss of data if the amplitude of the received signal falls below the sensitivity of the receiver.

Over small distances, the signal components that determine the composite signal are well correlated, i.e., there is a small probability that a significant change in the signal power envelope will occur over the distance. If a transmission of a data packet can be initiated and completed before the relative movement between the receiver and transmitter exceeds the "small distance", data loss to fading is unlikely to occur. The maximum "small distance" wherein a high degree of correlation exists is referred to hereafter as the "correlation distance".

As expressed in wavelengths of the carrier frequency, the correlation distance is one half ($\frac{1}{2}$) of the wavelength, while a more conservative value is one quarter ($\frac{1}{4}$) of the wavelength. Taking this correlation distance into consideration, the size of the data packet for segmentation purposes can be calculated. For example, at 915 MHz (a preferred RF transmission frequency), a quarter wavelength is about 8.2 centimeters. A mobile radio moving at ten (10) miles per hour, or 447 centimeters per second, travels the quarter wavelength in about 18.3 milliseconds. In such an environment, as long as the segment packet size remains under 18.3 milliseconds, fading does not pose any problems. In a preferred embodiment, five (5) millisecond data packet segments are chosen which provides a quasi-static multipath communication environment.

Duty Cycle

In a preferred embodiment, each base station broadcasts HELLO messages about every two (2) seconds. If upon power up, two base stations choose to broadcast at the exact same broadcast, collisions between HELLO messages would occur and continue to occur in a lock-step fashion upon each broadcast. To prevent such an occurrence, each base station chooses a pseudo-random offset from the 2 second base time between HELLO messages to actually broadcast the HELLO message. For example, instead of beginning each HELLO message broadcast at exactly 2 seconds after the last, the base station might pseudo-randomly offset the 2 seconds by a negative (−) value of 0.2, yielding a broadcast at 1.8 seconds. Because every base station generates a different pseudo-random offset generation, the problem of lock-stepping collisions is avoided.

Additionally, instead of using a true randomization, a pseudo-random offset is used which bases all pseudo-random offset calculations on a seed value (the "seed"). The "seed" is broadcast in each HELLO message so that the timing of the next HELLO message may be calculated by any listening mobile terminal. The use of the seed, and pseudo random offset generation, allows the terminal to "sleep" (enter an energy and CPU saving mode) between HELLO messages and be able to "wake up" (dedicate energy and CPU concentration on RF reception) and stay awake for the minimal time needed to receive the next HELLO message. The relationship between the time that a base station must remain awake to the time it may sleep is called the "duty cycle".

Using a 2 second HELLO to HELLO message timing with a pseudo-random offset range of +/−⅓ of a second, the preferred embodiment has achieved a very low duty cycle. Further details of this timing can be found in the Bridge Layer Specification in Appendix E.

In addition, Appendix A provides a list of the program modules which are found in microfiche Appendix B. These modules comprise an exemplary computer program listing of the source code ("C" programming language) used by the network controllers and intelligent base transceivers of the present invention. Note that the term "AMX" found in Appendices A and B refers to the operating system software used. "AMX" is a multi-tasking operating system from KADAK Products, Ltd., Vancouver, B.C., Canada. Appendix C, D, E, F, and G provide system specifications for the SST Network Architecture, SST Network Frame Format, Bridging Layer, MAC Layer, and Physical Layer of one embodiment of the present invention.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents.

What is claimed is:

1. A multi-hop data communication network having RF capability comprising:
    a plurality of terminal nodes; and
    a plurality of bridging nodes that operate to, at least, dynamically create and revise communication pathways between nodes in the network, each of the bridging nodes independently storing and maintaining local information that specifies how communication traffic should flow through that bridging node, and the plurality of bridging nodes, together, providing a specification for the communication pathways;
    where each of the bridging nodes, using polling messages with a backward learning technique, operate to, at least, independently create and maintain locally stored information to specify how communication traffic should flow through that bridging node.

2. The multi-hop data communication network of claim 1, wherein the plurality of bridging nodes operate to dynamically create and revise communication pathways between nodes in the network based, at least in part, on communication link conditions.

3. The multi-hop data communication network of claim 2, wherein the plurality of bridging nodes operate to receive messages from the terminal nodes that are based, at least in part, on the communication link conditions.

4. The multi-hop data communication network of claim 3, wherein the messages from the terminal nodes comprise information that is based, at least in part, on the communication link conditions.

5. The multi-hop data communication network of claim 3, wherein the messages from the terminal nodes are addressed to bridging nodes that are determined based, at least in part, on the communication link conditions.

6. The multi-hop data communication network of claim 2, wherein the plurality of bridging nodes operate to dynamically create and revise communication pathways between nodes in the network based, at least in part, on communication link interference conditions.

7. The multi-hop data communication network of claim 2, wherein the plurality of bridging nodes operate to dynamically create and revise communication pathways between nodes in the network based, at least in part, on communication link RF interference conditions.

8. The multi-hop data communication network of claim 2, wherein the plurality of bridging nodes operate to dynamically create and revise communication pathways between nodes in the network based, at least in part, on communication bandwidth.

9. The multi-hop data communication network of claim 2, wherein the plurality of bridging nodes operate to dynamically create and revise communication pathways between nodes in the network based, at least in part, on communication link data rate.

10. The multi-hop data communication network of claim 2, wherein the plurality of bridging nodes operate to dynamically create and revise communication pathways between nodes in the network based, at least in part, on communication path loading conditions.

11. The multi-hop data communication network of claim 2, wherein the plurality of bridging nodes operate to dynamically create and revise communication pathways between nodes in the network based, at least in part, on node loading conditions.

12. The multi-hop data communication network of claim 2, wherein the plurality of bridging nodes operate to dynamically create and revise communication pathways between nodes in the network based, at least in part, on RF communication link stability.

13. The multi-hop data communication network of claim 2, wherein the plurality of bridging nodes operate to dynamically create and revise communication pathways between nodes in the network based, at least in part, on detection of unattached nodes.

14. The multi-hop data communication network of claim 2, wherein the plurality of bridging nodes operate to dynamically create and revise communication pathways between nodes in the network based, at least in part, on signal strength.

15. The multi-hop data communication network of claim 2, wherein the plurality of bridging nodes operate to dynamically create and revise communication pathways between nodes in the network based, at least in part, on physical communication link type.

16. The multi-hop data communication network of claim 2, wherein the plurality of bridging nodes operate to dynamically create and revise communication pathways between nodes in the network based, at least in part, on physical movement of at least one of the plurality of terminal nodes.

17. The multi-hop data communication network of claim 2, wherein at least one of the bridging nodes operates to monitor communication link conditions.

18. The multi-hop data communication network of claim 2, wherein at least one of the terminal nodes operates to monitor communication link conditions.

19. The multi-hop data communication network of claim 1, wherein the polling message comprises a HELLO message.

20. The multi-hop data communication network of claim 1, wherein the polling message comprises a beacon message.

21. The multi-hop data communication network of claim 1, wherein the bridging nodes operate to transmit polling messages at substantially constant periodic intervals.

22. The multi-hop data communication network of claim 21, wherein the substantially constant periodic intervals comprise a calculated random component.

23. In a multi-hop data communication network having RF capability and a plurality of RF terminal nodes, a bridging node that operates to at least:
  dynamically create and revise communication pathways between nodes in the network;
  independently store and maintain local information that specifies how communication traffic should flow through the bridging node; and
  using polling messages with a backward learning technique, independently create and maintain locally stored information to specify how communication traffic should flow through the bridging node.

24. The bridging node of claim 23, wherein the polling messages comprise information that is based, at least in part, on communication link conditions.

25. The bridging node of claim 23, wherein using polling messages with a backward learning technique comprises receiving response messages corresponding to the polling messages, wherein the response messages are based, at least in part, on communication link conditions.

26. The bridging node of claim 25, wherein the response messages comprise information that is based, at least in part, on communication link conditions.

27. The bridging node of claim 25, wherein the response messages are addressed to the bridging node based, at least in part, on communication link conditions.

28. The bridging node of claim 23, wherein using polling messages with a backward learning technique comprises:
  periodically, at substantially regular intervals, transmitting a polling message;
  receiving a response message to the polling message from a second node; and
  in response to the received response message, entering information of the second node in a routing table.

29. The bridging node of claim 28, wherein the bridging node further operates to, at least, communicate a message indicative of the response message to a third node.

30. The method of claim 28, wherein the response message comprises an attach request.

31. The method of claim 28, wherein the response message is based, at least in part, on communication link conditions.

32. The method of claim 31, wherein the response message comprises information that is based, at least in part, on communication link conditions.

33. The method of claim 31, wherein the response message is addressed to the bridging node based, at least in part, on communication link conditions.

* * * * *